United States Patent
Aoki et al.

(10) Patent No.: US 7,692,137 B2
(45) Date of Patent: Apr. 6, 2010

(54) REFLECTED LIGHT DETECTING APPARATUS, REFLECTION CHARACTERISTIC DETERMINING APPARATUS, AND OBJECT DETECTING APPARATUS

(75) Inventors: Takahiro Aoki, Kawasaki (JP); Soichi Hama, Kawasaki (JP); Mitsuaki Fukuda, Kawawsaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/196,512

(22) Filed: Aug. 22, 2008

(65) Prior Publication Data
US 2008/0302951 A1 Dec. 11, 2008

Related U.S. Application Data

(63) Continuation of application No. PCT/JP2006/303785, filed on Feb. 28, 2006.

(51) Int. Cl.
*H01J 40/14* (2006.01)
(52) U.S. Cl. .................. 250/221; 250/559.07; 356/603
(58) Field of Classification Search ................. 250/221, 250/222.1, 559.07, 559.08; 356/601, 603
See application file for complete search history.

(56) References Cited

U.S. PATENT DOCUMENTS 6,975,408 B2 * 12/2005 Igaki et al. .................. 356/616

2004/0210155 A1  10/2004  Takemura et al.

FOREIGN PATENT DOCUMENTS

| JP | 8-178632 | 7/1996 |
|----|----------|--------|
| JP | 8-285541 | 11/1996 |
| JP | 2000-75046 | 3/2000 |
| JP | 2002-148352 | 5/2002 |
| JP | 2003-290154 | 10/2003 |
| JP | 2003-322684 | 11/2003 |
| JP | 2004-333505 | 11/2004 |
| WO | WO 2004088588 A1 * | 10/2004 |

OTHER PUBLICATIONS

International Search Report mailed May 16, 2006 for International Application No. PCT/JP2006/303785.
English translation of JP 8-285541, published Nov. 1, 1996.

* cited by examiner

*Primary Examiner*—Kevin Pyo
(74) *Attorney, Agent, or Firm*—Staas & Halsey LLP

(57) ABSTRACT

A photographing section photographs a photographing object, a light-projector projects a light spot parallel to or approximately parallel to an optical axis of the photographing section onto the photographing object, and a detector detects, from an image of the photographing object photographed by the photographing section, a light spot from the light-projector reflected by the photographing object on the basis of an arrangement position of the light-projector relative to the photographing section. A reflected light spot of light projected onto a detection object can be detected with certainty, and erroneous detection of the reflected light spot, in particular, erroneous detection due to disturbance light, can be prevented at a low cost, without an increase in size of the apparatus.

14 Claims, 27 Drawing Sheets

FIG. 6

| No. | CENTER COORDINATES (POSITION) 25a | |
|---|---|---|
| | X COORDINATE | Y COORDINATE |
| 1 | 10 | 45 |
| 2 | 24 | 36 |
| 3 | 36 | 36 |
| 4 | 45 | 35 |
| 5 | 26 | 25 |
| 6 | 47 | 23 |
| 7 | 24 | 17 |
| 8 | 35 | 17 |
| 9 | 44 | 16 |
| 10 | 30 | 10 |

FIG. 7

| No. | X COORDINATE | Y COORDINATE | CHECK-UP INFORMATION |
|---|---|---|---|
| 1 | 25 | 35 | 0 |
| 2 | 35 | 35 | 0 |
| 3 | 45 | 35 | 0 |
| 4 | 25 | 25 | 0 |
| 5 | 45 | 25 | 0 |
| 6 | 25 | 15 | 0 |
| 7 | 35 | 15 | 0 |
| 8 | 45 | 15 | 0 |

| No. | CENTER POSITION 66a | |
| --- | --- | --- |
|  | X COORDINATE | Y COORDINATE |
| 1 | 25 | 33 |
| 2 | 34 | 32 |
| 3 | 39 | 20 |
| 4 | 34 | 12 |
| 5 | 25 | 9 |
| 6 | 17 | 13 |
| 7 | 12 | 21 |
| 8 | 16 | 28 |
| 9 | 30 | 17 |

| No. | RADIUS | CENTER COORDINATES ||
| | | X COORDINATE | Y COORDINATE |
| --- | --- | --- | --- |
| 1 | 13.2 | 26 | 20 |
| 2 | 12.9 | 25 | 21 |
| . | . | . | . |
| . | . | . | . |
| . | . | . | . |

67c-1

US 7,692,137 B2

REFLECTED LIGHT DETECTING APPARATUS, REFLECTION CHARACTERISTIC DETERMINING APPARATUS, AND OBJECT DETECTING APPARATUS

This application is a continuation application, filed under 35 USC 111(a), of International Application PCT/JP2006/303785, filed Feb. 28, 2006.

TECHNICAL FIELD

The present invention relates to a technique for detecting presence/absence of reflection of light projected onto an object.

BACKGROUND ART

Heretofore, there has been reflected light detecting apparatus that irradiates illumination onto an object, and detects reflected light therefrom. As a way of making practical use of this reflected light detecting apparatus, there is detection sensor that detects a person or an object.

For example, as shown in FIG. 25, in an automatic door system 100, an illumination irradiating apparatus 111 of a reflected light detecting apparatus 100 projects light onto a position through which a person as being a verification object (detection object) 101 passes, and a light receiving element 112 detects reflected light of the projected light. When detecting reflection, the reflected light detecting apparatus 110 determines that a man is passing therethrough, and opens a door 102.

Incidentally, the light irradiated from the illumination irradiating apparatus 111 of the reflected light detecting apparatus 110 may be infrared-rays other than spot light such as illumination, laser beam and the like.

As another use of the reflected light detecting apparatus, the reflected light detecting apparatus may be used as discriminating apparatus that discriminates a detection object on the basis of whether the reflected light is detected or not. For example, the reflected light detecting apparatus is used to discriminate a flat-shaped object such as a sheet of paper, a metal plate or the like according to whether it has gloss or not.

As techniques relating to the reflected light detecting apparatus, there has been a technique (refer to Patent Document 1, below) in which a plurality of reflective sensors are arranged to detect not only presence/absence of a detection object but also a traveling direction of the detection object by using a time lag of the detection time, and a technique (refer to Patent Document 2, below) in which a plurality of light emitting elements is arranged, and irradiates light onto a detection object to measure a surface shape of the detection object by detecting the reflected light by a photosensitive element.

In the technique taught in Patent Document 2 below, the plural light emitting elements are used to drive a plurality of distance sensors in order to measure the surface shape of the detection object.

Meanwhile, the reflected light detecting apparatus that irradiates illumination onto a detection object and detects reflection of the illumination has a disadvantage that the reflected light detecting apparatus is easily affected by disturbance light. In other words, in environments where disturbance light such as sunlight, external illumination or the like exists, the reflected light detecting apparatus could accidentally mistake external light (disturbance light) other than light irradiated from the reflected light detecting apparatus itself for reflected light from an object onto which the reflected light detecting apparatus irradiated the light.

In concrete, as shown in FIG. 26(a), for example, in an image 121a where a verification object 120 irradiated illumination thereon is photographed, reflected light beams 122 and 123 of irradiated illumination appears on the verification object 120 in the image 121a under situation where the surface of the verification object 120 reflects light and no disturbance light exists.

To the contrary, as shown in FIG. 26(b), under situation where disturbance light exists, disturbance light beams 124a-124c and a light beam 125, which is disturbance light entering onto the verification object 120, are photographed, along with the reflected light beams 122 and 123.

Under situation where disturbance light exists as above, the reflected light detecting apparatus could accidentally mistake the disturbance light 124a to 124c and 125 for the reflected light beams 122 and 123.

Furthermore, as shown in FIG. 27(a), in an image 131a where a verification object 130 irradiated illumination thereon is photographed, no light is in the image 131a under situation where the surface of the verification object 130 does not reflect light and no disturbance light exists.

To the contrary, as shown in FIG. 27(b), disturbance light beams 132a, 132b, 133a and 133b enter in the image 131b under situation where disturbance light exists.

In the above case, the reflected light detecting apparatus could accidentally mistake disturbance light beams 132a, 132b, 133a and 133b, particularly, the disturbance light beams 133a and 113b entering onto the verification object 130 in the image 131b, for reflected light beams. Incidentally, when the reflected light detecting apparatus is applied as the above discriminating apparatus, the apparatus could accidentally mistake the disturbance light beams 133a and 133b for reflected light beams, and erroneously conclude that the verification object 130 is one that reflects light.

One of the possible measures is that a light source of disturbance light is specified and the light source is turned off or arrangement of the reflected light detecting apparatus is changed to prevent light irradiated from the light source from entering into the image. However, as the disturbance light, there can be sunlight entering from the window, surrounding illumination, etc. It is difficult to specify light sources of these kinds of disturbance light, and more difficult to specify a light source to prevent the disturbance light from entering into the image. Particularly, when the disturbance light is caused from sunlight, erroneous detection due to the disturbance could occur light in only a specific time zone because the illuminating angle or the like of the sun changes according to the season or time. Accordingly, reproducibility of erroneous detection due to disturbance light is largely lowered much, which causes an increase in time to specify the disturbance light, for example.

Therefore, there is a technique that employs a data-like pulse beam as the light beam to be irradiated onto the verification object, and determines that the verification object is detected (that is, the reflected light is detected) when a photo detector receives a designated data-like pulse beam (refer to Patent Document 3 below, for example).

Patent Document 1: Japanese Patent Laid-Open Publication No. 2000-075046

Patent Document 2: Japanese Patent Laid-Open Publication No. H08-178632

Patent Document 3: Japanese Patent Laid-Open Publication No. 2002-148352

DISCLOSURE OF THE INVENTION

Problems to be Solved by the Invention

According to the technique taught in the above Patent Document 3, the designated data-like pulse beam is irradiated from an irradiator and whether light received by a photo detector is the designated pulse-like beam or not is checked, in order to avoid the sensor from mistaking disturbance light for the reflected light. Therefore, the sensor needs respective circuits for processing the pulse-like data on both the irradiating side and the receiving side, separately.

In the technique disclosed in the above Patent Document 3, it is necessary to provide a mechanism for irradiating the designated data-like pulse beam to the radiator, and a mechanism for determining whether or not received light is the designated data-like pulse beam to the photo detector. This causes an increase in size of the apparatus and an increase in cost for adding a function of discriminating disturbance light from reflected light.

In light of the above disadvantages, an object of the present invention is to make it possible to detect reflected light of light projected onto a detection object with certainty, thereby accomplishing prevention of erroneous detection of the reflected light, particularly, erroneous detection due to disturbance light, at a low cost without an increase in size of the apparatus.

Means for Solving the Problem

To attain the above object, a reflected light detecting apparatus of this invention comprises a photographing section for photographing a photographing object, a light-projector for projecting a light spot parallel to or approximately parallel to an optical axis of the photographing section onto the photographing object, and a detector for detecting, from an image of the photographing object photographed by the photographing section, a light spot (hereinafter referred to as a reflected light spot) from the light-projector reflected by the photographing object on the basis of an arrangement position of the light-projector relative to the photographing section.

It is preferable that the detector comprise an extractor for extracting a position of a light spot in the image, and a first judgment section for judging whether the light spot in the image is the reflected light spot on the basis of the position of the light spot extracted by the extractor and the arrangement position of the light-projector.

Further, it is preferable that the first judgment section of the detector compare the position of the light spot extracted by the extractor with a position of the reflected light spot in the image beforehand set on the basis of the arrangement position of the light-projector, and judge that the light spot is the reflected light spot when the position of the light spot coincides with the position of the reflected light spot, while judging that the light spot is not the reflected light spot when the position of the light spot does not coincide with the position of the reflected light spot.

It is preferable that the reflected light detecting apparatus comprise a reflection determination section for determining that the photographing object is a reflecting object when the reflected light spot is detected by the detector, while determining that the photographing object is a non-reflecting object when the reflected light spot is not detected by the detector.

It is preferable that the light-projector be provided plural in number, the detector perform the detection on the basis of arrangement positions of the plural light-projectors, and the reflected light detecting apparatus further comprise a reflection determination section for determining that the photographing object is a reflecting object when the number of the reflected light spot detected by the detector is equal to or larger than a predetermined number, while determining that the photographing object is a non-reflecting object when the number of the reflected light spots detected by the detector is smaller than the predetermined number.

It is preferable that the light-projector be provided plural in number, and the detector comprise an extractor for extracting positions of light spots in the image, a shape calculator for calculating a shape (hereinafter referred to as an extracted light shape) corresponding to a predetermined shape determined by arrangement positions of the plural light-projectors, the extracted light shape being determined by part of or all of the positions of the plural light spots extracted by the extractor, and a second judgment section for judging whether the plural light spots forming the extracted light shape are the reflected light spots on the basis of the extracted light shape calculated by the shape calculator and the predetermined shape.

It is preferable that the reflected light detecting apparatus further comprise a reflection determination section for determining that the photographing object is a reflecting object when the number of the reflected light spots detected by the detector is equal to or larger than a predetermined number, while determining that the photographing object is a non-reflecting object when the number of the reflected light spots detected by the detector is smaller than the predetermined number.

Meanwhile, it is preferable that the plural light-projectors be arranged so that the predetermined shape is a circle or a rectangle.

To accomplish the above object, a reflected light detecting apparatus of this invention comprises a photographing section being able to photograph a photographing object, a plurality of light-projectors for projecting light spots parallel to or approximately parallel to an optical axis of the photographing section onto the photographing object, and a detector for detecting, from an image photographed by the photographing section, light spots (hereinafter referred to as reflected light spots) on the basis of a predetermined shape determined by arrangement positions of the plural light-projectors relative to the photographing section.

It is preferable that the reflected light detecting apparatus further comprise a determination section for determining that the photographing object exists when the reflected light spots are detected by the detector, while determining that the photographing object does not exist when the reflected light spots are not detected by the detector.

Further, it is preferable that the determination section determine that the photographing object exists when the number of the reflected light spots detected by the detector is equal to or larger than a predetermined number, while determining that the photographing object does not exist when the number of the reflected light spots detected by the detector is smaller than the predetermined number.

It is preferable that the detector comprise an extractor for extracting positions of light spots in the image, a shape calculator for calculating a shape (hereinafter referred to as an extracted light shape) corresponding to the predetermined shape, the extracted light shape being determined by part of or all of the positions of the plural light spots extracted by the extractor, and a second judgment section for judging whether the plural light spots forming the extracted light shape are the reflected light spots on the basis of the extracted light shape calculated by the shape calculator and the predetermined shape.

It is preferable that the second judgment section of the detector judge that the plural light spots forming the extracted light shape are the reflected light spots when the extracted light shape and the predetermined shape are the same in position and size, while judging that at least one of the plural light spots forming the extracted light shape is not the reflected light spot when either the positions or the sizes do not coincide.

It is also preferable that the detector comprise an extractor for extracting positions of light spots in the image, a shape calculator for calculating a shape (hereinafter referred to as an extracted light shape) corresponding to the predetermined shape, the extracted light shape being determined by part of or all of the positions of the plural light spots extracted by the extractor, a third judgment section for judging whether the extracted light shape and the predetermined shape are the same in position and size, an estimator for estimating positions of the reflected light spots from the plural light-projectors on the basis of the extracted light shape and the arrangement positions of the plural light-projectors relative to the photographing section when the third judgment section judges that the extracted light shape and the predetermined shape are the same in position and size, and a fourth judgment section for comparing each of positions of the plural reflected light spots estimated by the estimator with each of positions of the plural light spots extracted by the extractor, and determining that a light spot extracted by the extractor coinciding with any one of the light spots estimated by the estimator in position is the reflected light spot.

It is preferable that the plural light-projectors be arranged so that the predetermined shape is a circle.

To attain the above object, a reflection characteristic determining apparatus of this invention comprises a photographing section for photographing a photographing object, a plurality of light-projectors for projecting light spots parallel to or approximately parallel to an optical axis of the photographing section onto the photographing object, an extractor for extracting positions of light spots in an image of the photographing object photographed by the photographing section, a shape calculator for calculating a shape (hereinafter referred to as an extracted light shape) corresponding to a predetermined shape determined by arrangement positions of the plural projectors, the extracted light shape being determined by part of or all of the positions of plural light spots extracted by the extractor, a shape judgment section for judging whether the extracted light shape calculated by the shape calculator coincides with the predetermined shape, and a reflection determination section for determining that the photographing object is a reflecting object when the shape judgment section judges that the extracted light shape coincides with the predetermined shape, while determining that the photographing object is a non-reflecting object when the shape judgment section judges that the extracted light shape does not coincide with the predetermined shape.

It is preferable that the plural light-projectors be arranged so that the predetermined shape is a circle.

To attain the above object, an object detecting apparatus of this invention comprises a photographing section for photographing a photographing object, a plurality of light-projectors for projecting light spots parallel to or approximately parallel to an optical axis of the photographing section onto the photographing object, an extractor for extracting positions of light spots in an image of the photographing object photographed by the photographing section, a shape calcula-
tor for calculating a shape (hereinafter referred to as an extracted light shape) corresponding to a predetermined shape determined by arrangement positions of the plural light-projectors, the extracted light shape being determined by part of or all of the positions of the plural light spots extracted by the extractor, a shape judgment section for judging whether the extracted light shape calculated by the shape calculator coincides with the predetermined shape, and a determination processor for determining that the photographing object exists when the shape judgment section judges that the extracted light shape coincides with the predetermined shape, while determining that the photographing object does not exist when the shape judgment section judges that the extracted light shape does not coincide with the predetermined shape.

It is preferable that the plural light-projectors be arranged so that the predetermined shape is a circle.

EFFECTS OF THE INVENTION

As stated above, since the detector detects, on the basis of an arrangement position of the light projector relative to the photographing section, from an image, reflected light reflected from a photographing object in the reflected light detecting apparatus of this invention, the detector can detect the reflected light from the image with certainty, whereby erroneous detection of reflected light can be prevented.

Unlike the known technique taught in the above patent document 3, for example, the reflected light detecting apparatus of this invention does not need to be newly added with a hardware configuration (circuit or the like for transmitting/receiving pulse-like data) for preventing erroneous detection of reflected light. It is therefore possible to accomplish prevention of erroneous detection of reflected light at a low cost, without an increase in size of the apparatus.

Since, in the reflected light detecting apparatus of this invention, the detector detects, from an image, reflected light from the plural light-projectors reflected from a photographing object in an image on the basis of a predetermined shape determined by arrangement positions of the plural light-projectors relative to the photographing section, the reflected light can be detected from the image more certainly, and erroneous detection of the reflected light can be prevented more certainly.

On this occasion, since the reflected light detecting apparatus of this invention does not need to be newly added with a hardware configuration for preventing erroneous detection of the reflected light excepting a plurality of the light-projectors, it is possible to accomplish prevention of erroneous detection of the reflected light at a low cost, without an increase in size of the apparatus.

In the reflection characteristic determining apparatus of this invention, the shape calculator calculates an extracted light shape corresponding to a predetermined shape determined by arrangement positions of the plural light-projectors, the extracted light shape being determined by part of or all of positions of plural light spots in an image extracted by the extractor; and the reflection determination section determines that the photographing object is a reflecting object when the shape judgment section judges that the extracted light shape coincides with the predetermined shape determined by the plural light-projectors, while determining that the photographing object is a non-reflecting object when the shape judgment section judges that the extracted light shape does not coincide with the predetermined shape. Therefore, it is possible to determine the reflection characteristic of the photographing object with certainty, while preventing erroneous detection of the reflected light.

On this occasion, the reflection characteristic determining apparatus of this invention does not need to be newly added with a hardware configuration for preventing erroneous detection of the reflected light, excepting the plural light-projectors. It is therefore possible to accomplish prevention of erroneous detection of the reflected light at a low cost, without an increase in size of the apparatus.

In the object detecting apparatus, the shape calculator calculates an extracted light shape corresponding to a predetermined shape determined by arrangement positions of the plural light-projectors, the extracted light shape being determined part of or all of positions of plural light spots in an image extracted by the extractor; and the determination processor determines that the photographing object exists when the shape judgment section judges that the extracted light shape coincides with a predetermined shape determined by the plural light-projector, while determining that the photographing object does not exist when the shape judgment section judges that the extracted light shape does not coincide with the predetermined shape. Therefore, it is possible to determine presence/absence of the photographing object with certainty while preventing erroneous detection of the reflected light, and detect the photographing object with certainty.

On this occasion, the object detecting apparatus of this invention does not need to be newly added with a hardware configuration for preventing erroneous detection of the reflected light excepting the plural light-projectors. Therefore, it is possible to accomplish prevention of erroneous detection of the reflected light at a low cost, without an increase in size of the apparatus.

BRIEF DESCRIPTION OF THE DRAWINGS

FIG. 6 Diagram showing an example of configuration of an extracted spot list prepared by the spot detector of the reflected light detector of the reflected light detecting apparatus of the reflection characteristic judgment system according to the first embodiment of this invention;

FIG. 7 Diagram showing an example of configuration of a reflected light spot check list prepared by a reflected light spot verification section of the reflected light detector of the reflected light detecting apparatus of the reflection characteristic judgment system according to the first embodiment of this invention;

FIG. 17 Diagram showing an example of configuration of an extracted spot list prepared by a spot detector of the reflected light detector of the reflected light detecting apparatus of the automatic door system according to the second embodiment of this invention;

EXPLANATIONS OF NUMERALS

Figure 1:
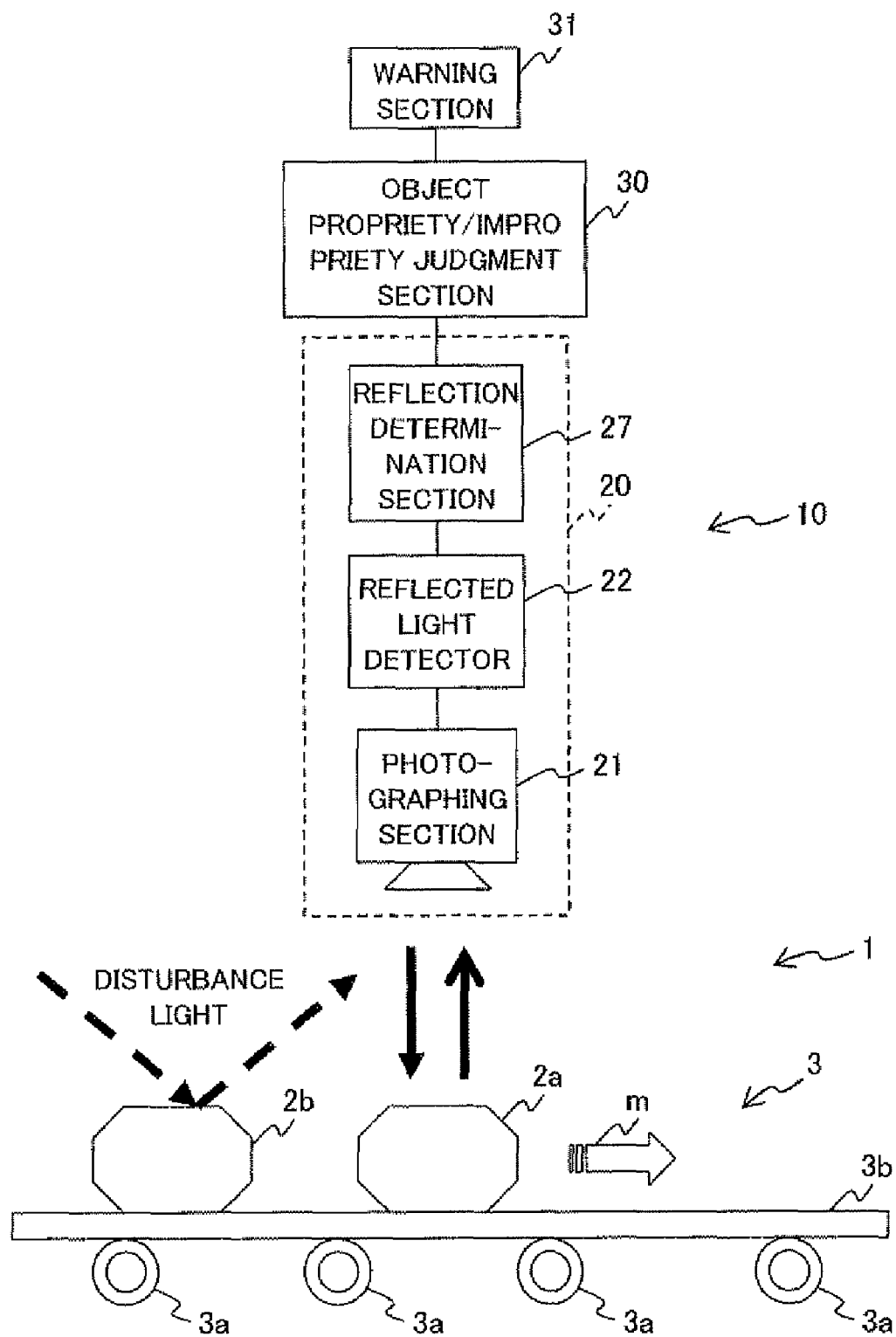
FIG. 1 Diagram for illustrating a configuration of the reflection characteristic judgment system according to a first embodiment of this invention.

1 . . . reflection characteristic judgment system
2, 2a, 2b, 5, 101, 120, 130 . . . verification object (photographing object)
3 . . . conveying apparatus
3a . . . roller
3b . . . belt
10 . . . reflection characteristic determining apparatus
20, 110 . . . reflected light detecting apparatus
21, 61 . . . photographing section
22, 62 . . . reflected light detector (detector)
23, 64 . . . imaging device (photographing section)
24, 24a-24h, 65, 65a-65h . . . illuminator (light-projector)
25, 66 . . . spot detector (extractor)
25a, 66a . . . extracted spot list
26 . . . reflected light spot verification section (first judgment section)
26a . . . reflected light spot check list
27 . . . reflection determination section
30 . . . object propriety/impropriety judgment section
31 . . . warning section
40, 40a, 43, 45, 121a, 121b, 131a, 131b . . . image
41, 44, 44-1-44-10, 46, 46-1-46-9 spot
44-2-44-9, 46-1-46-8, 122, 123 reflected light spot (reflected light)
44-1, 44-10, 46-9, 124a-124c, 125, 132a, 132b, 133a, 133b . . . disturbance light
50, 100 . . . automatic door system
51, 102 . . . door
52 . . . door opening/closing apparatus
60 . . . reflected light detecting apparatus (object detecting apparatus)
63 . . . determination processor (determination section)
67 . . . shape calculator 67a . . . combination selector
67b . . . calculator
67c . . . shape judgment section (second judgment section, third decision section)
67c-1 . . . circle list
68 . . . reflected light verification section
68a . . . reflected light spot estimator (estimator)
68b . . . reflected light spot judgment section (fourth judgment section)
111 . . . illumination radiating apparatus
112 . . . light receiving element

BEST MODE FOR CARRYING OUT THE INVENTION

Hereinafter, embodiments of the present invention will be described with reference to the drawings.

[1] As to First Embodiment of the Invention

First, configuration of a reflection characteristic judgment system 1 will be described as a first embodiment of this invention, with reference to FIG. 1.

As shown in FIG. 1, the reflection characteristic judgment system 1 has a conveying apparatus 3 which conveys verification objects (objects to be verified; object to be photographed) 2a and 2b, and a reflection characteristic determining apparatus 10 which judges a reflection characteristic of a plurality of the verification objects 2a and 2b (hereinafter, simply referring to as verification objects 2 when the verification object 2a and the verification object 2b are not particularly distinguished from each other) successively conveyed by the conveying apparatus 3.

The verification object 2 is, for example, a product whose surface is made of metal. The product has a characteristic of mirror reflection because its metal surface is very smooth when the product is normal. When the product is abnormal, and faulty, its surface does not reflect.

In the reflection characteristic judgment system 1, the reflection characteristic determining apparatus 10 determines a reflection characteristic of the verification object 2 (that is, whether the verification object 2 reflects or not) conveyed by the conveying apparatus 3 to thereby determine that the verification object 2 is normal when the verification object 2 reflects, or determines that the verification object 2 is abnormal when the verification object 2 does not reflect. In such a way, the reflection characteristic judgment system 1 checks propriety/impropriety of the verification object 2 as a product. In the following description, an object (verification object 2) whose surface reflects is referred to as a reflecting object, whereas an object (verification object 2) whose surface does not reflect is referred to as a nonreflecting object.

Here, the conveying apparatus 3 is a belt conveyor, which rotates at least one of a plurality of rollers 3a to convey a plurality of the verification objects 2 on a belt 3b in a direction denoted by an arrow m along with the belt 3b up to the position of the reflection characteristic determination apparatus 10.

The reflection characteristic determining apparatus 10 is arranged above the belt 3b of the conveying apparatus 3, which has a reflected light detecting apparatus 20, an object propriety/impropriety judgment section 30 and a warning section 31.

The reflected light detecting apparatus 20 has a photographing section 21, a reflected light detector (detector) 22 and a reflection determination section (determination section) 27.

Figure 2:
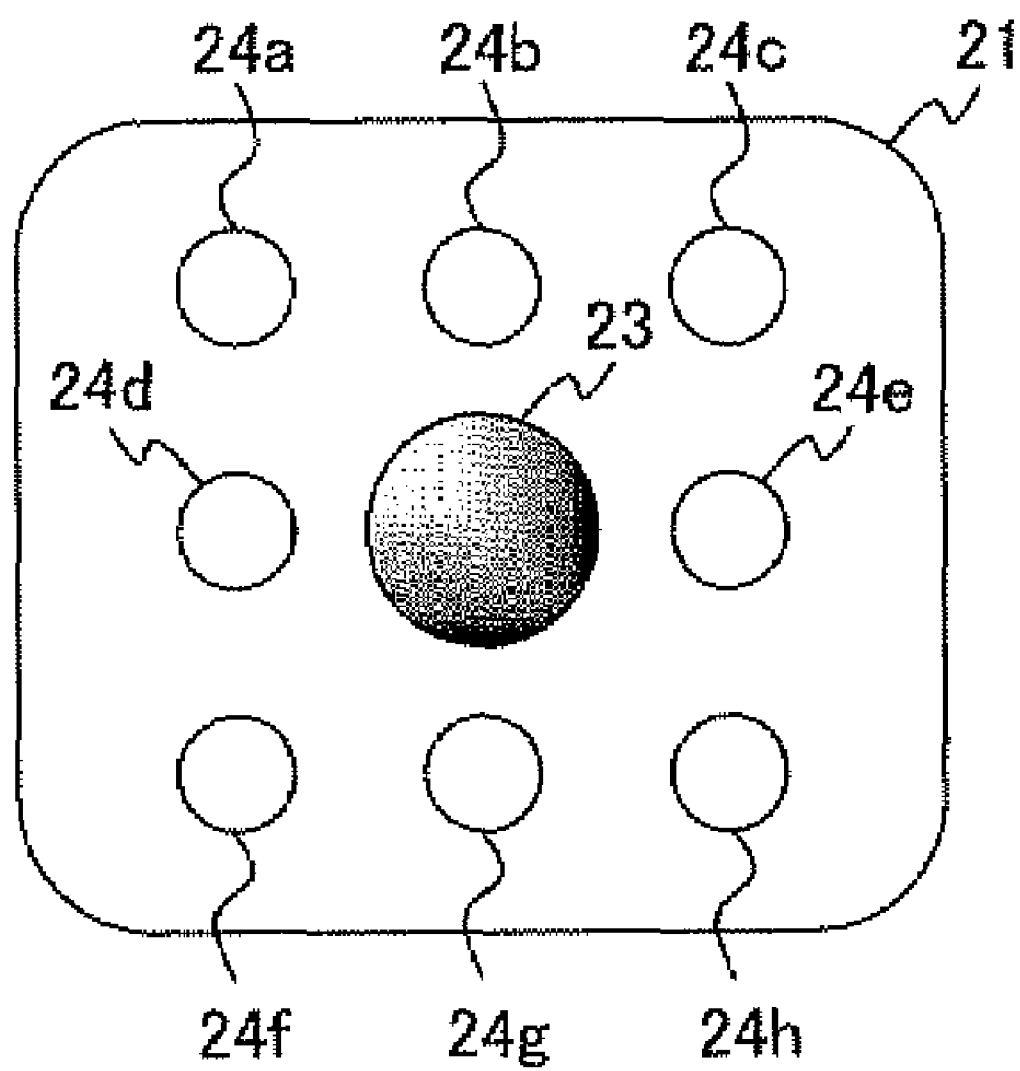
FIG. 2 Diagram for illustrating a configuration of a photographing section of a reflected light detecting apparatus of the reflection characteristic judgment system according to the first embodiment of this invention.

The photographing section 21 photographs the verification object 2 while projecting light (illumination). A surface of the photographing section 21 facing the verification object 2 is configured as shown in FIG. 2.

The photographing section 21 has an imaging device (photographing section) 23 and a plurality of illuminators (light-projectors) 24a through 24h.

The imaging device 23 photographs the verification object 2. The imaging device 23 is so arranged that the optical axis thereof is vertical or approximately vertical to the verification object 2 or the belt 3b.

The imaging device 23 calculates a timing at which the verification object 2 arrives on the conveying apparatus 3 in association with, for example, an apparatus in the upstream of the reflected light detecting apparatus 20, and photographs the verification object 2 at the calculated timing, in order to photograph the verification object 2 at a timing that the verification object 2 enters in a photographing range of the imaging device 23 itself, desirably at a timing that the verification object 2 arrives at the center of the photographing range.

As the imaging device 23, practically used is a CCD (Charged Coupled Device) imaging device, a CMOS (Complementary Metal-Oxide semiconductor) imaging device or the like, for example.

The plural illuminators 24a through 24h project light beams parallel to or approximately parallel to the optical axis of the imaging device 23.

These plural illuminators 24a through 24h (hereinafter, referred to simply as a plurality of illuminators 24 when these plural illuminators 24a through 24h are not particularly discriminated from one another) are so arranged as to form a square centered at the imaging device 23.

Light beams of the plural illuminators 24 are fed from light sources of, for example, LEDs (Light Emitting Diodes), incandescent lamps, fluorescent lamps, light led through optical fibers.

When the light sources of the plural illuminators 24 are LEDs, incandescent lamps, fluorescent lamps or the like, each of the plural illuminator 24 may have an adjustment mechanism (not shown) to change the light emitted from the light source into spotlight. This adjustment mechanism has, for example, a collimator lens for converting the light emitted from the light source into parallel light, and an aperture for adjusting the spot diameter of the light having passed through the collimator lens.

Each of the illuminators 24 associates with the imaging device 23 to irradiate the spotlight onto the verification object 2 when the imaging device 23 at least photographs the verification object 2. For the benefit of the photographing section 21 of the reflected light detecting apparatus 20, spotlight is always projected from each of the plural illuminators 24 onto the verification object 2 in the image photographed by the imaging device 23.

Figure 3:
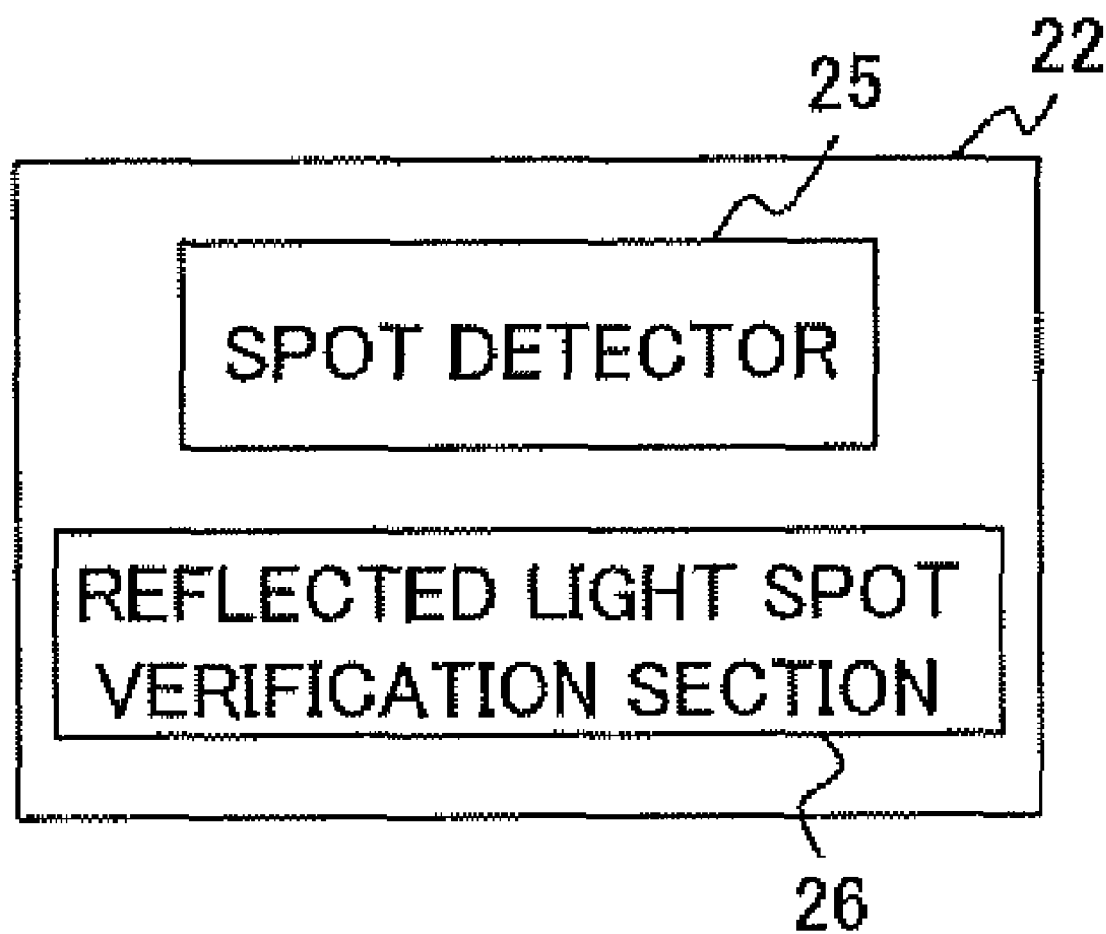
FIG. 3 Block diagram showing a configuration of a reflected light detector of the reflected light detecting apparatus of the reflection characteristic judgment system according to the first embodiment of this invention.

The reflected light detector 22 detects, from an image of the verification object 2 photographed by the imaging device 23, light spots (hereinafter, referred to as reflected light spots) from the plural illuminators 24 reflected by the verification object 2 on the basis of arranged positions (arrangement coordinates) of the plural illuminators 24 relative to the imaging device 23. As shown in FIG. 3, the reflected light detector 22 has a spot detector (extractor) 25 and a reflected light spot verification section (first judgment section) 26.

The spot detector 25 extracts positions of light beams (spots; bright areas when the light source of each illuminator 24 is any one of LED, incandescent lamp, fluorescent lamp and light led through optical fiber) in an image of the verification object 2 (hereinafter, simply referred to as image) photographed by the imaging device 23 of the photographing section 21 to detect spots in the image.

Further, the spot detector 25 lists positions of the detected light spots.

In concrete, the spot detection section 25 performs a binarization process on the image photographed by the photographing section 21 with a predetermined threshold value. The spot detector 25 then specifies spots in the binarized image.

Figure 4A:
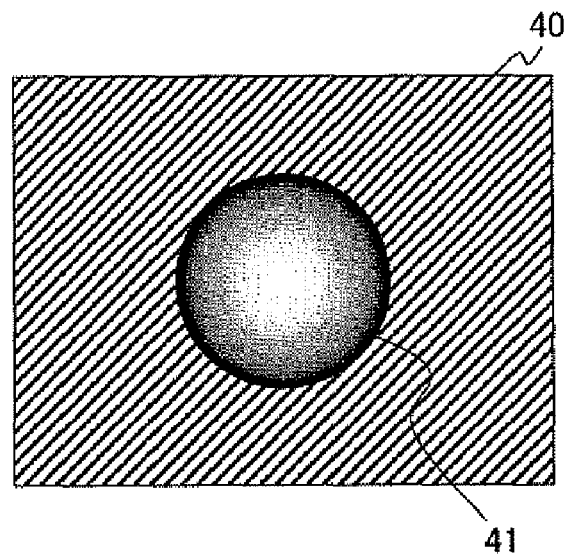
FIG. 4 Diagrams for illustrating a spot detection process by a spot detector of the reflected light detector of the reflected light detecting apparatus of the reflection characteristic judgment system according to the first embodiment of this invention, wherein (a) is a diagram showing an image photographed by an imaging device of the photographing section; (b) is a diagram showing an image obtained by performing a binarization process on the image shown in (a); and (c) is a diagram for illustrating a position of a spot specified by the spot detector.
Figure 4B:
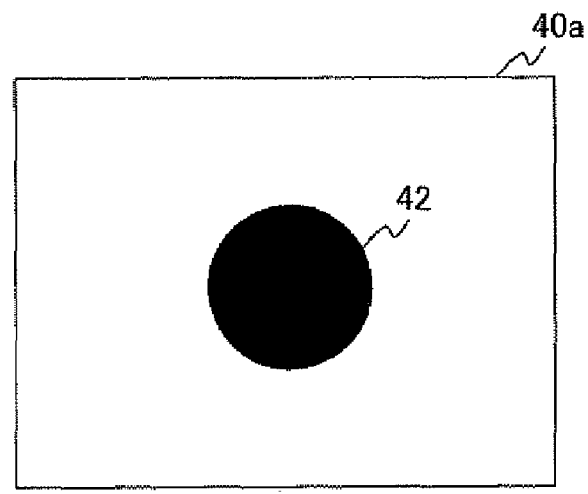

For example, when a spot 41 exists in an image 40 photographed by the imaging device 23 as shown in FIG. 4(a), the spot detector 25 performs the binarization process on the image 40 to specify a black-painted portion 42 in the binarized image 40a shown in FIG. 4(b).

Figure 4C:
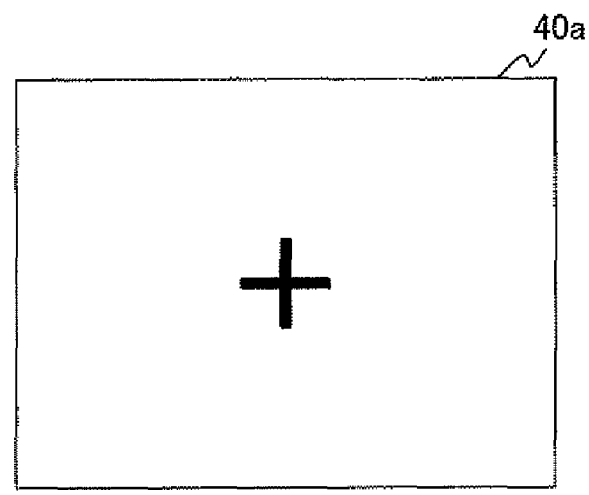

FIGS. 4(a), 4(b) and 4(c) to be described later show part of an image photographed by the imaging device 23. Further, a portion designated by oblique lines shows simply the background. FIG. 4(b) shows an image where the black portion and the white portion in a general original image subjected to the binarization process are reversed in order to clearly show the spot 42. Namely, the spot appears almost white in contrast to the remaining background as shown in FIG. 4(a) because the spot is in the bright area, hence, originally, the spot 42 is white while the remaining background area is black in the image 40a subjected to the binarization process by the spot detector 25.

The spot detector 25 determines coordinates as the center of the spot, from a range of a plurality of black pixels (spot light pixels) continuously existing in an image corresponding to the black-painted portion 42 specified as the spot.

In concrete, the spot detector 25 calculates average values of the X coordinate and the Y coordinate of each of the plural pixels specified as the spot as designated by "+", in FIG. 4(c), and extracts positions of the X coordinate and the Y coordinate of the obtained average value as the center coordinates (position) of this spot.

The spot detector 25 performs the labeling process when specifying a spot in the binarized image 40a, that is, detecting an area in which predetermined (here, black (but originally white as stated hereinbefore)) pixels continuously exist.

In the above description, average values of coordinates of pixels in an area specified as a spot by the spot detection section 25 are determined as a position of the spot. Alternatively, the spot detector 25 may extract center values (medians), not average values of coordinates of each pixel.

Figure 5:
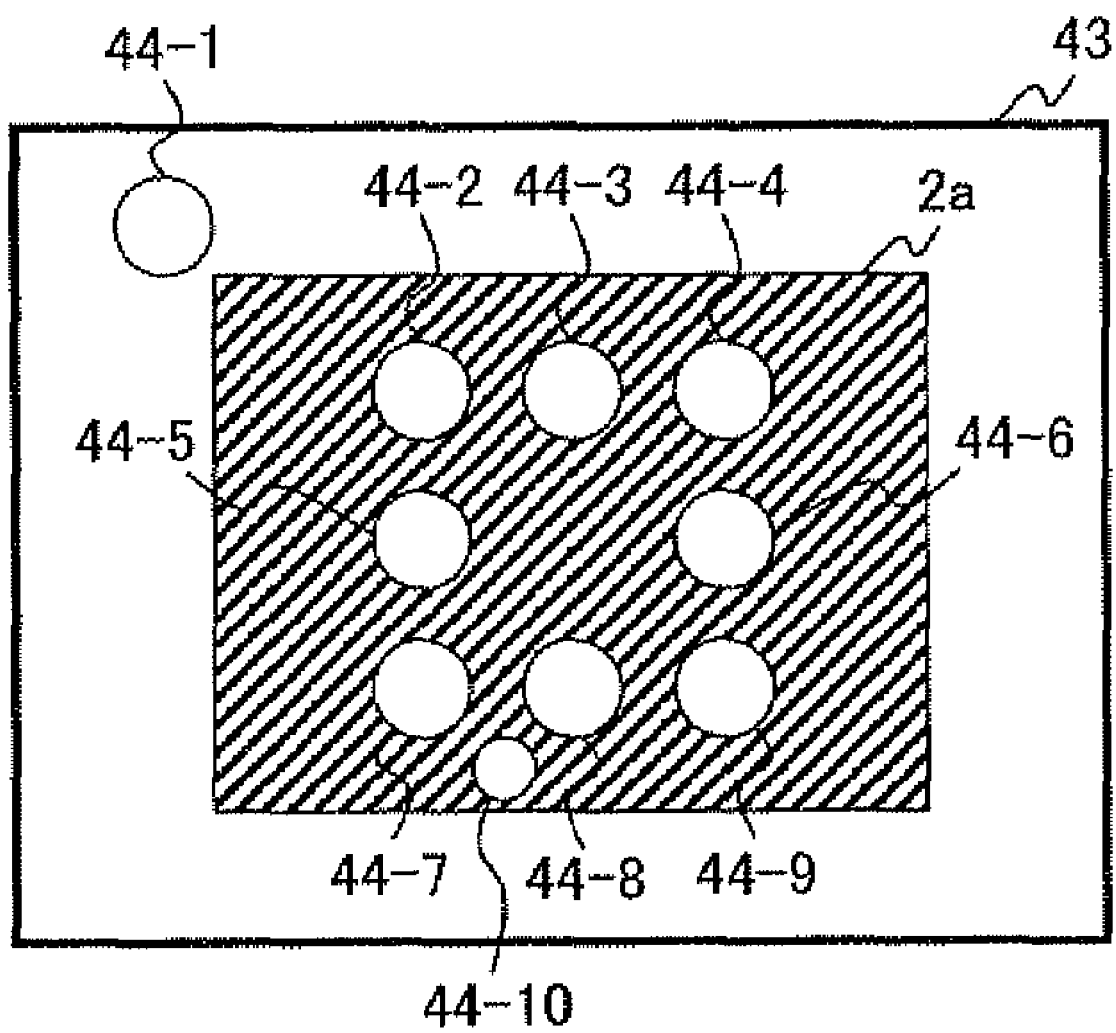
FIG. 5 Diagram showing an example of image photographed by the photographing section of the reflected light detecting apparatus of the reflection characteristic judgment system according to the first embodiment of this invention.

For example, if the imaging device 23 photographs an image 43 of the verification object 2a shown in FIG. 5, the spot detector 25 extracts all positions of spots 44-1 through 44-10, which are bright areas in the image 43. Incidentally, the image 43 is obtained by photographing the verification object 2a on the belt 3b, the spots 44-1 through 44-10 in the image 43 schematically shown as circles in the image 43 in FIG. 5.

The spots 44-2 through 44-9 are reflected light beams (reflected light spots) of light beams projected from the illuminators 24a through 24h, respectively. The reflected light spot verification section 26 judges that these spots 44-2 through 44-9 are reflected light spots of the respective illuminators 24a through 24h.

The spots 44-1 and 44-10 are not reflected light spots of the plural illuminators 24 but disturbance light spots. As designated by broken-line arrows in FIG. 1, for example, the spots 44-1 and 44-10 are caused by light (sunlight or the like) reflected from an adjacent verification object 2b entering into the imaging device 23 and photographed in the image 43.

The spot detector 25 executes the listing process by recording center coordinates (position) of each spot extracted from the image 43, as shown in FIG. 6, for example. Here, the lower left hand corner of the image 43 is designated as the origin (0,0) of the X coordinate and the Y coordinate.

As shown in FIG. 6, a list (reflection spot candidate list; hereinafter, referred to as an extracted spot list) 25a prepared by the spot detector 25 is comprised of three fields which hold a serial number (denoted as "No." in the drawing) for each of the spots 44-1 through 44-10, and an X coordinate and a Y coordinate as a position of the same.

The spot detector 25 stores each of the spots 44-1 through 44-10 in the extracted spot list 25a in the order they were extracted, pairing an X coordinate and a Y coordinate showing a position of the spot. In FIG. 6, a serial number (No.) "1" corresponds to the spot 44-1 in FIG. 5, the X coordinate and the Y coordinate of which are "10" and "45", respectively. A serial number "2" corresponds to the spot 44-2, the X coordinate and the Y coordinate of which are "24" and "36", respectively A serial number "3" corresponds to the spot 44-3, the X coordinate and the Y coordinate of which are "36" and "36", respectively. A serial number "4" corresponds to the spot 44-4, the X coordinate and the Y coordinate of which are "45" and "35", respectively. A serial number "5" corresponds to the spot 44-5, the X coordinate and the Y coordinate of which are "26" and "25", respectively. A serial number "6" corresponds to the spot 44-6, the X coordinate and the Y coordinate of which are "47" and "23", respectively. A serial number "7" corresponds to the spot 44-7, the X coordinate and the Y coordinate of which are "24" and "17", respectively. A serial number "8" corresponds to the spot 44-8, the X coordinate and the Y coordinate of which are "35" and "17", respectively. A serial number "9" corresponds to the spot 44-9, the X coordinate and the Y coordinate of which are "44" and "16", respectively. A serial number "10" corresponds to the spot 44-10, the X coordinate and the Y coordinate of which are "30" and "10", respectively.

The reflected light spot verification section 26 judges and verifies whether a spot (that is, a spot extracted by the spot detector 5) in the image is reflected light (hereinafter, referred to as reflected light spot) on the basis of positions of the spots extracted by the spot detector 25 and arrangement positions of the plural illuminators 24 relative to the imaging device 23.

In concrete, the reflected light spot verification section 26 compares a position of each spot held in the extracted spot list 25a, that is, a position of each spot extracted by the spot detector 25, with a position of each of reflected light spots (refer to a reflected light spot check list in FIG. 7 to be described later) in the image beforehand set on the basis of the arrangement positions of the plural illuminators 24.

When a spot which agrees in position with a reflected light spot beforehand set in the image exists in the extracted spot list 25a, the reflected light spot verification section 26 judges that this coinciding spot is a reflected light spot of the reflected light.

On the other hand, when there is not one coinciding with the extracted spot list 25a, the reflected light spot verification section 26 judges that this reflected light spot does not exist.

Here, "coinciding" does not mean complete "coinciding", but satisfying predetermined conditions as described later, that is, "coinciding" within a predetermined error.

Here, description will be made of a practical operation of the reflected light spot verification section 26 on the image 43 shown in FIGS. 5 and 6.

First, the reflected light spot verification section 26 prepares the reflected light spot check list 26a shown in FIG. 7, before verifying the reflected light spot, that is, when the reflection characteristic judgment system 1 is started, for example.

In the reflection characteristic judgment system 1, a distance between the verification object 2 and the photographing section 21 is constant. Therefore, when the verification object 2 is a reflecting object, positions (coordinates) of reflected light spots of the plural illuminators 24 reflected from the verification object 2 in the image 43 photographed by the imaging device 23 are constant, or approximately constant.

In order to verify whether reflected light spots are detected by the spot detector 25 by making use of a characteristic that positions of reflected light spots in the image 43 are constant or approximately constant, the reflected light spot verification section 26 beforehand prepares (sets) and holds positions (center positions) of reflected light spots in the image as the reflected light spot check list 26a.

Namely, the reflected light spot verification section 26 beforehand examines coordinates on the image 43 at which the reflected light spots should be detected.

Accordingly, the reflected light check list 26a shown in FIG. 7 holds positions (X coordinates and Y coordinates) of reflected light spots on the image 43 of the respective plural illuminators 24a through 24h. In the reflected light spot check list 26a, a serial number (denoted as "No." in the drawing) "1" corresponds to the illuminator 24a, the X coordinate and Y coordinate of which are "25" and "35", respectively. A serial number "2" corresponds to the illuminator 24b, the X coordinate and Y coordinate of which are "35" and "35", respectively. A serial number "3" corresponds to the illuminator 24c, the X coordinate and Y coordinate of which are "45" and "35", respectively. A serial number "4," corresponds to the illuminator 24d, the X coordinate and Y coordinate of which are "25" and "25", respectively. A serial number "5" corresponds to the illuminator 24e, the X coordinate and Y coordinate of which are "45" and "25", respectively. A serial number "6" corresponds to the illuminator 24f, the X coordinate and Y coordinate of which are "25" and "15", respectively. A serial number "7" corresponds to the illuminator 24g, the X coordinate and Y coordinate of which are "35" and "15", respectively. A serial number "8" corresponds to the illuminator 24h, the X coordinate and Y coordinate of which are "45" and "15" respectively.

When preparing the reflected light check list 26a, the reflected light spot verification section 26 extracts a position of each of the reflected light spots of these plural illuminators 24 in the same manner as the spot detector 25 extracts the positions, having been described hereinbefore with reference to the above FIGS. 4(a) through 4(c).

As shown in FIG. 7, the reflected light spot check list 26a holds check-up information representing whether a position at each of the serial numbers "1" through "8" (that is, each of reflected light spots of the illuminators 24a through 24h) coincides with a position of each spot extracted by the spot detector 25 (that is, whether the spot exists in the image 43).

The checkup information is a flag of one bit. When judging that the reflected light spot exists, the reflected light spot verification section 26 sets the check-up information of a serial number corresponding to the judged reflected light spot to "1". When determining that the reflected spot does not exist, the reflected light post verification section 26 sets the check-up information to "0", leaving it intact.

The reflected light spot verification section 26 judges whether each of the reflected light spots in the reflected light spot check list 26 shown in FIG. 7 coincides with a spot detected by the spot detector 25 in the ascending order of the serial number, beginning with the serial number "1".

Figure 8:
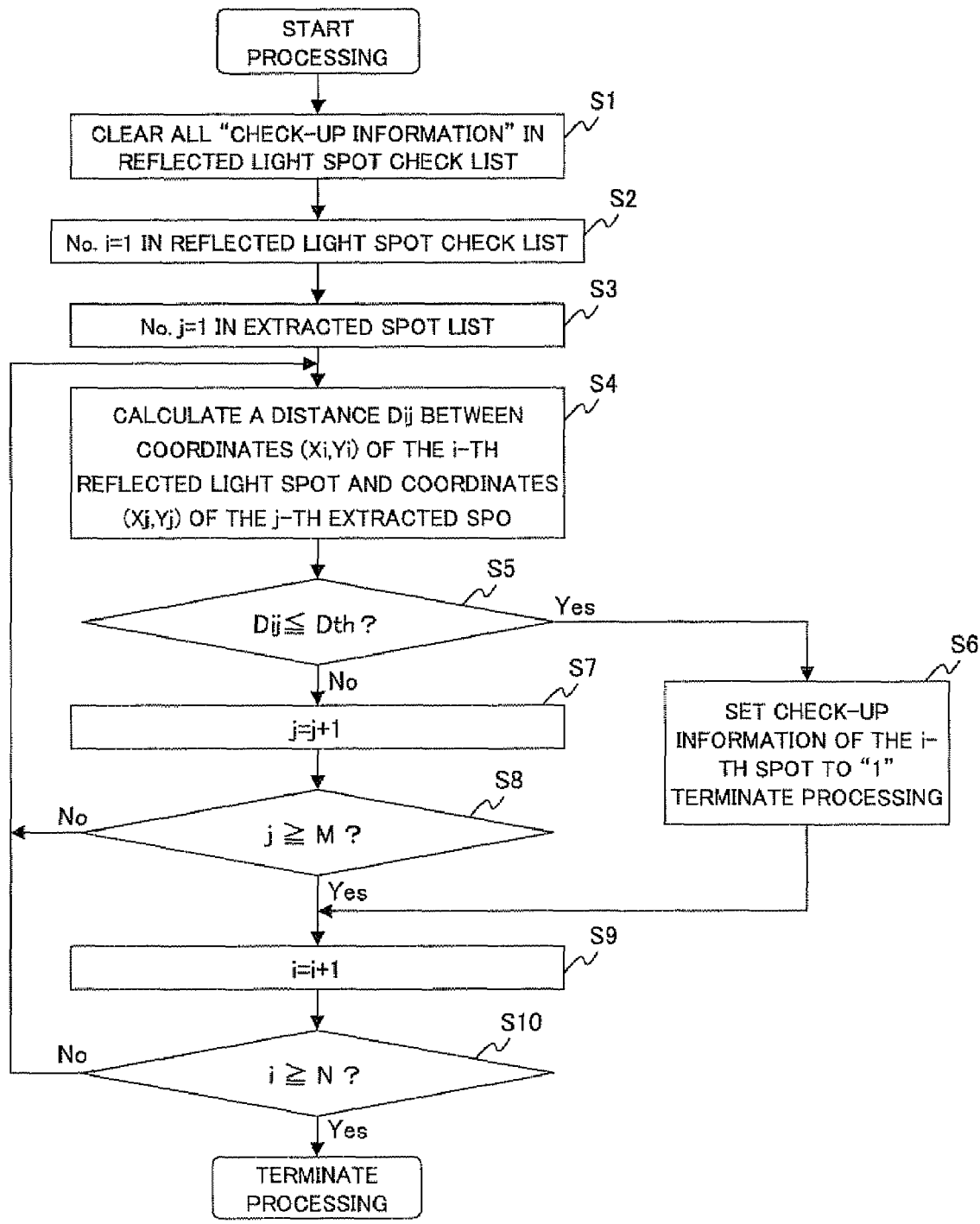
FIG. 8 Flowchart showing an example of operation procedure of the reflected light spot verification section of the reflected light detector of the reflected light detecting apparatus of the reflection characteristic judgment system according to the first embodiment of this invention.

Namely, the reflected light spot verification section 26 performs the verification process in an operation procedure shown in a flowchart (steps S1 through S10) shown in FIG. 8.

As shown in FIG. 8, the reflected light spot verification section 26 clears all pieces of the check-up information (that is, sets all pieces of the check-up information to "0") in the reflected light spot check list 26a prepared beforehand (step S1).

Then, the reflected light spot verification section 26 sets a serial number ("No.") to be verified to "1" in order to verify the spots in the reflected light spot check list in the ascending order, beginning with the serial number "1" (step S2).

Further, the reflected light spot verification section 26 sets a serial number ("No.") j in the extracted spot list 25a to "1" in order to confirm whether a reflected light spot at the serial number i is detected by the spot detector 25, by making comparison of the serial numbers in order (step S3).

The reflected light spot verification section 26 calculates a distance Dij between a position (Xi coordinate and Yi coordinate) of the i-th (here, No. 1) reflected light spot in the reflected light spot check list 26a and a position (Xj coordinate and Yj coordinate) of the j-th (here, No. 1) spot in the extracted spot list 25a by using the following equation (step S4).

[Equation 1]

$$Dji = \sqrt{(Xi-Xj)^2 + (Yi-Yj)^2} \quad (1)$$

The reflected light spot verification section 26 judges whether or not the distance Dij calculated by using the above equation (1) is equal to or smaller than a predetermined value Dth set beforehand (step S5).

When the distance Dij is equal to or smaller than the predetermined value Dth set beforehand (Yes route at step S5), the reflected light spot verification section 26 determines that the i-th reflected light spot in the reflected light spot check list 26a coincides with the j-th spot in the extracted spot list 25a, that is, that the i-th reflected light spot exists in the image 43, sets the check-up information of the i-th reflected light spot to "1" (step S6), and proceeds to a process at step S9 to be described later, not executing steps S7 and S8 to be described later.

Namely, when judging that the i-th reflected light spot and the j-th spot coincide with each other within a range of the predetermined error which is the predetermined value Dth set beforehand, the reflected light spot verification section 26 judges that the j-th spot is a reflected light spot.

On the other hand, when the distance Dij is larger than the predetermined value Dth (No route at step S5), the reflected light spot verification section 26 judges that the i-th reflected light spot in the reflected light spot check list 26a does not coincide with the j-th spot in the extracted spot list 25a, that is, that the i-th reflected light spot does not exist in the image 43, and proceeds to the process at step S7 to be described later, with the check-up information of the i-th reflected light spot remaining "0".

In other words, when the i-th reflected light spot does not coincide with the j-th spot within a range of a predetermined error which is the predetermined value Dth beforehand set, the reflected light spot verification section 26 judges that the j-th spot is not a reflected light spot.

The reflected light spot verification section 26 then increments the serial number "j" in the extracted spot list 25 by one (step S7), and judges whether or not the incremented serial number "j" is equal to or larger than a sum (predetermined value M (here, M=10) of spots detected by the spot detection section 25 (step S8).

Namely, the reflected light spot verification section 26 determines whether or not the i-th reflected light spot in the reflected light spot check list 26a has been compared with each of all spots detected by the spot detection section 25 and has been verified.

When "j" updated at the above step S7 is not equal to or larger than a predetermined value M (No route at step S8), the reflected light spot verification section 26 executes the processes at the above steps S4 to S7 on the j-th spot updated in the extracted spot list 25a.

As above, the reflected light spot verification section 26 keeps making comparison of the position of each spot in the reflected light spot check list 26 with the position of every spot in the extracted spot list 25a until the reflected light spot verification section 26 judges that the position of this reflected light spot coincides with the position of any one of the spots in the extracted spot list 25a.

When "j" updated at the above step S7 is equal to or larger than the predetermined value M (Yes route at step S8), the reflected light spot verification section 26 judges that the i-th reflected light spot in the reflected light spot check list 26a does not exist in the image 43, and increments the serial number "1" in the reflected light post check list by one, with the check-up information of the i-th reflected light spot remaining "0" (step S9).

Next, the reflected light post detector 26 judges whether or not the incremented serial number "i" is equal to or larger than the sum (predetermined value N (here, N=8)) of reflected light spots in the reflected light spot check list 26a (step S10).

In other words, the reflected light spot verification section 26 determines whether or not to verify all the reflected light spots in the reflected light spot check list 26a.

When the updated "i" at the above step S9 is not equal to or larger than the predetermined value N (No route at step S10), the reflected light spot verification section 26 performs the processes at the above steps S4 to S9 on the updated i-th reflected light spot in the reflected light spot check list 26a.

As above, the reflected light spot verification section 26 executes the above verification process (the above steps S4 to S9) on every reflected spot in the reflected light spot check list 26a.

When "i" updated at the above step S9 is equal to or larger than the predetermined value N (Yes route at step S10), the reflected light spot verification section 26 terminates the verification process on the reflected light spots in the reflected light spot check list 26a.

As above, the reflected light spot verification section 26 judges whether or not each of all reflected spots held in the reflected light spot check list 26a exists in the image 43, by comparing it with every spot in the extracted spot list 25a.

Here, the reflected light spot verification section 26 judges that a reflected light spot at the serial number "1" in the reflected light spot check list 26a is the spot 44-2, judges that a reflected light spot at the serial number "2" is the spot 44-3, judges that a reflected light spot at the serial number "3" is the spot 44-4, judges that a reflected light spot at the serial number "4" is the spot 44-5, judges that a reflected light spot at the serial number "5" is the spot 44-6, judges that a reflected light spot at the serial number "6", is the spot 44-7, judges that a reflected light spot at the serial number "7" is the spot 44-8, and judges that a reflected light spot at the serial number "8" is the spot 44-9.

In other words, the reflected light spot verification section 26 judges that the spots 44-2 through 44-9 are reflected light spots, while judging that the spots 44-1 and 44-10 not agreeing with any reflected light spots in the reflected light spot check list 26a in position are disturbance light.

As shown in FIG. 1, when the reflected light detector 22 detects reflected light from the image 43, the reflection determination section 27 determines that the verification object 2a is a reflecting object. On the other hand, when the reflected light detector 22 does not detect reflected light from the image 43, the reflection determination section 27 determines that the verification object 2a is a non-reflecting object. Here, when the reflected light detector 22 detects seven or more reflected light spots from the image 43, the reflection determination section 22 determines that the verification object 2a is a reflecting object. On the other hand, when the number of spots of the reflected light detected by the reflected light detector 22 is less than seven, the reflection determination section 27 determines that the verification object 2a is a non-reflecting object. Incidentally, it is preferable to change a predetermined number (here, seven) of reflected light spots detected by the reflected light detector 22, which is a reference for which the reflection determination section 27 decides a reflecting object or a non-reflecting object, in consideration of and according to situations of installation of the imaging device 23, a shape of the surface of the verification object 2 and so forth.

Figure 9:
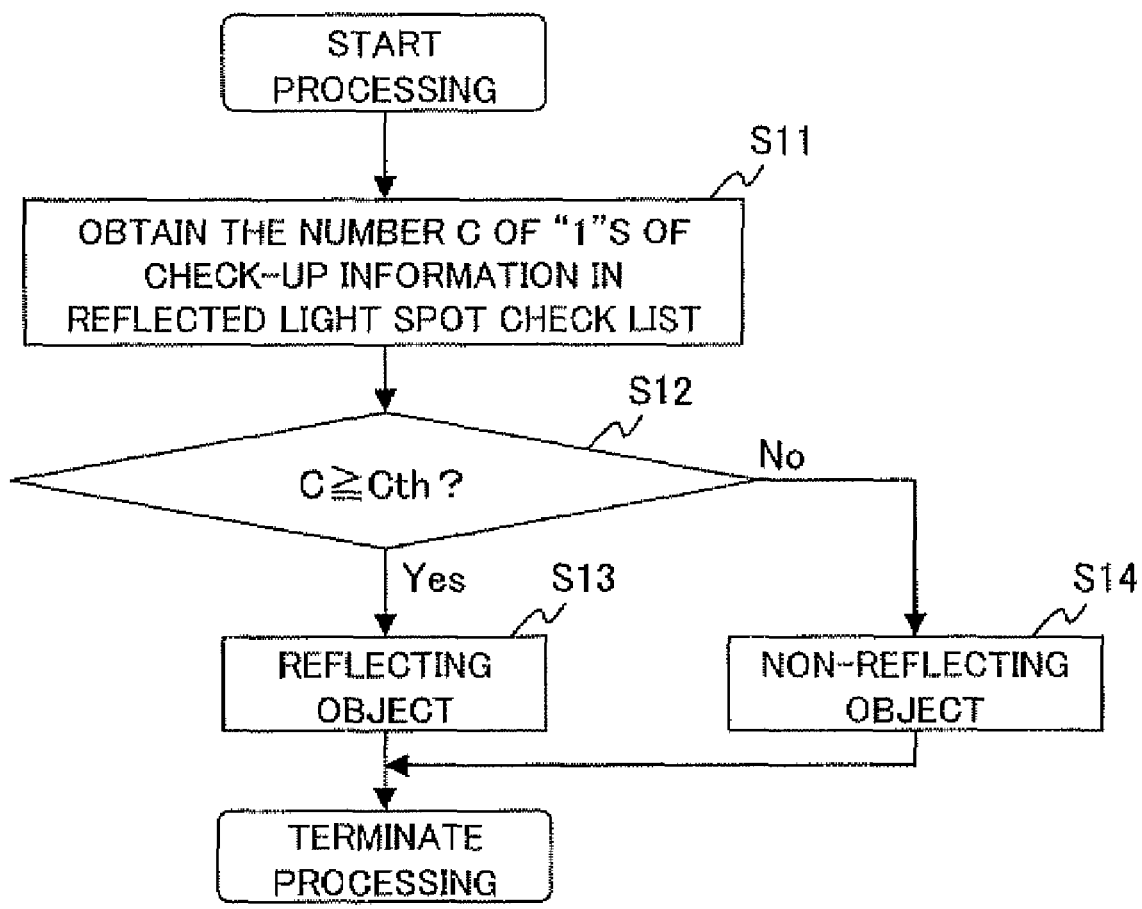
FIG. 9 Flowchart showing an example of operation procedure of a reflection determination section of the reflected light detecting apparatus of the reflection characteristic judgment system according to the first embodiment of this invention.

Now, description will be made of a more practical operation procedure of the reflection determination section 27 with reference to a flowchart (steps S11 to S14) shown in FIG. 9. When the process (refer to the steps S1 to S10 in FIG. 8 described above) of detecting reflected light from the image 43 by the reflected light detection section 22 is terminated, the reflection determination section 27 obtains the number C of reflected light spots whose check-up information is "1", in the reflected light spot check list 26a (step S11).

Namely, the reflection determination section 27 obtains a total number of reflected light spots that the reflected light spot detector 26 judged that these reflected light spots exist in the image 43, by counting the number of reflected light spots whose check-up information is "1" in the reflected light spot check list 26a.

The reflection determination section 27 then determines whether or not the number C is equal to or larger than a predetermined number Cth (here, "7") (step S12).

When the number C is equal to or larger than the predetermined value Cth (Yes route at step S12), the reflection determination section 27 determines that the verification object 2a is a reflecting object (step S13), and terminates the process.

On the other hand, when the number C is smaller than the predetermined value Cth (No route at step S12), the reflection determination section 27 determines that the verification object 2a is a non-reflecting object (step S14), and terminates the process.

As shown in FIG. 1, the object propriety/impropriety judgment section 30 judges propriety/impropriety of the verification object 2 on the basis of a result of determination by the reflection determination section 27. In practice, when the verification object 2a is a reflecting object, the object propriety/impropriety judgment section 30 judges that the verification object 2 is a desired normal object (a predetermined object). On the other hand, when the verification object 2 is a non-reflecting object, the object propriety/impropriety judgment section 30 judges that the verification object 2 is an improper object (not a desired predetermined object).

Figure 10:
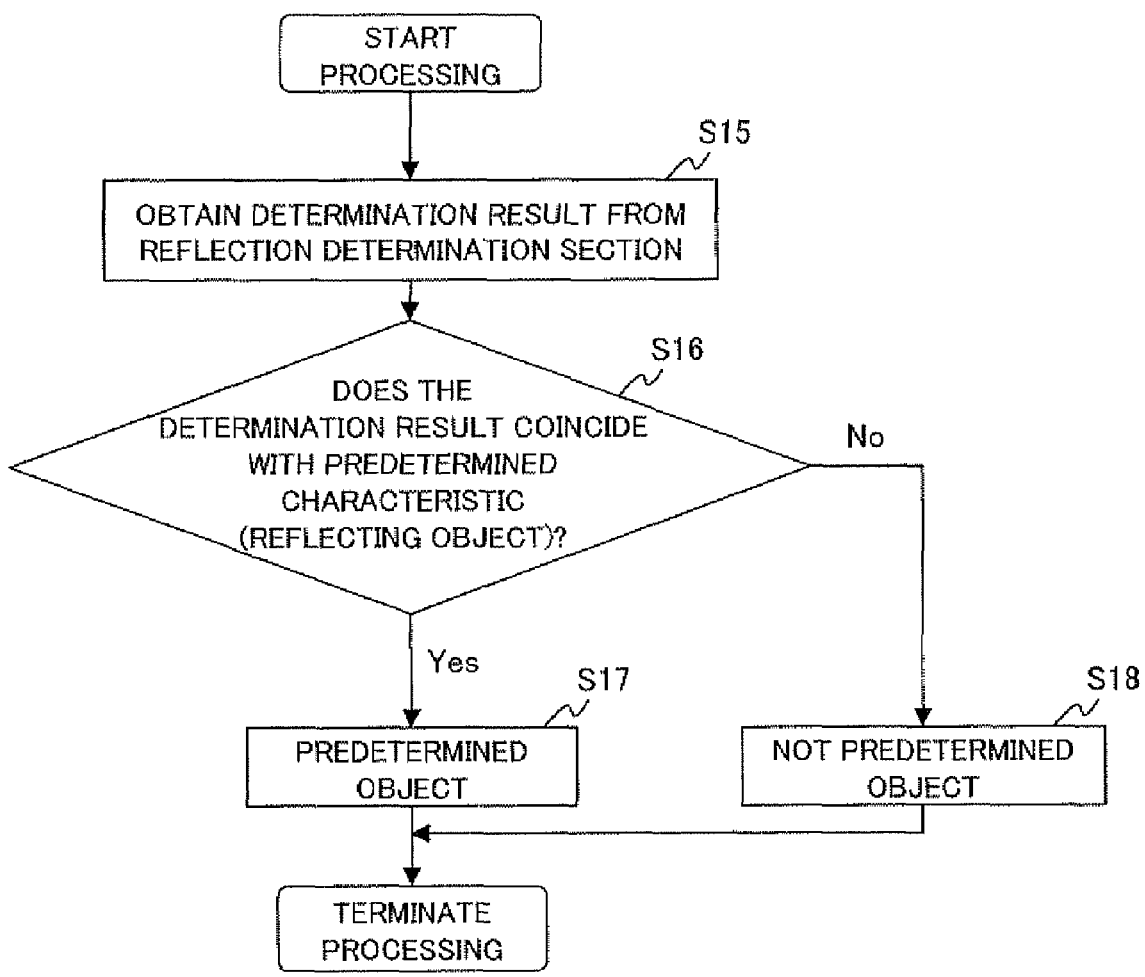
FIG. 10 Flowchart showing an example of operation procedure of an object propriety/impropriety judgment section of a reflection characteristic determining apparatus of the reflection characteristic judgment system according to the first embodiment of this invention.

As shown in a flowchart (steps S15 through S18) in FIG. 10, the object propriety/impropriety judgment section 30 obtains a result of determination from the reflection determination section 27 representing whether or not the verification object 2 is a reflecting object or a non-reflecting object (step S15), and judges whether or not the obtained determination result tells a predetermined characteristic (that is, whether or not the obtained determination result suggests a reflecting object) (step S16).

When the result of determination by the reflection determination section 27 suggests a reflecting object (Yes route at step S16), the object propriety/impropriety judgment section 30 judges that the verification object 2 is a predetermined object having a predetermined characteristic (step S17), and terminates the process.

On the other hand, when the result of determination by the reflection determination section 27 is a non-reflecting object (No route at step S16), the object propriety/impropriety judgment section 30 judges that the verification object 2 is not a predetermined object having the predetermined characteristic (step S18), and terminates the process.

As shown in FIG. 1, the warning section 31 gives warning to the outside according to a result of determination by the object propriety/impropriety judgment section 30. In practice, when the object propriety/impropriety judgment section 30 gives a decision successively predetermined number of times that the verification object 2 is not the predetermined object, the warning section 30 gives warning to the outside, by generating sound from a buzzer (not shown), for example.

The warning section 31 has an error counter (not shown) to count the number of times that the object propriety/impropriety judgment section 30 successively gives a decision that the verification object 2 is not the predetermined object.

In this invention, it should be noted that the warning given by the warning section 31 is not limited to sound generated by a buzzer or the like. When the reflection characteristic judgment system 1 has a monitor, for example, a predetermined image may be displayed on the monitor to give warning to the outside.

Figure 11:
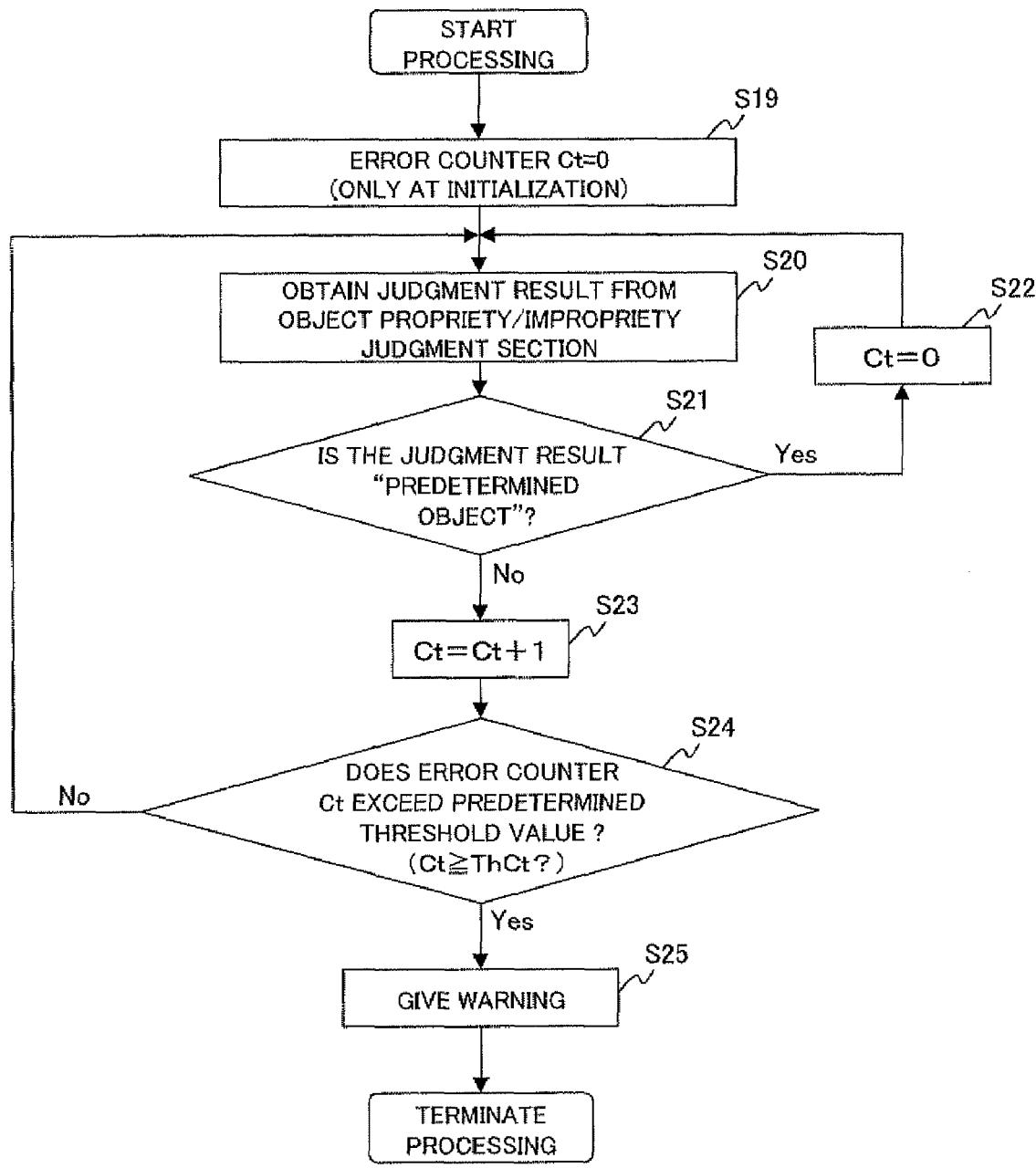
FIG. 11 Flowchart showing an example of operation procedure of a warning section of the reflection characteristic determining apparatus of the reflection characteristic judgment system according to the first embodiment of this invention.

Now, description will be made of a practical operation procedure of the warning section 31 with reference to a flowchart (steps S19 through S25) in FIG. 11. First, the warning section 31 resets the value of an error counter Ct to "0" when the operation is initiated (initialization) (step S19).

The warning section 31 then obtains a result of determination made by the object propriety/impropriety judgment section 30 (step S20) and determines whether or not the obtained result of determination is "a predetermined object" (step S21).

When the obtained result of determination suggests "the predetermined object" (Yes route at step S21), the warning section 31 resets the value Ct of the error counter to "0" (step S22), and returns to the process at the above step S20.

On the other hand, when the obtained result of determination is not "the predetermined object" (that is, when the obtained result of determination tells that the verification object is "not the predetermined object; No route at step S21), the warning section 31 increments the value Ct of the error counter by one (step S23).

The warning section 31 determines whether or not the value Ct of the error counter updated at the above step S23 exceeds a predetermined threshold value ThCt set beforehand (step S24).

When the value Ct of the error counter is smaller than the predetermined threshold value ThCt (No route at step S24), the warning section 31 goes back to the process at the above step S20.

On the other hand, when the value Ct of the error counter is equal to or larger than the predetermined threshold value ThCt (Yes route at step S24), the warning section 31 gives warning to the outside (step S25), and terminates the process.

As above, in the reflection characteristic judgment system 1 (particularly, the reflected light detecting apparatus 20) according to the first embodiment of this invention, the reflected light detector 22 detects, from the image 43, reflected light (reflected light spots) from the plural illuminators 24 reflected by the verification objection 2 on the basis of arrangement positions of the plural illuminators 24 relative to the imaging device 23. As this, the reflected light detector 22 can detect the reflected light spots 44-2 to 44-8 from the image 43 with certainty, thereby preventing erroneous detection of reflected light.

In the reflected light detecting apparatus 20, it is unnecessary to newly add a hardware structure (circuit or the like for transmitting/receiving pulse-like data) to prevent erroneous detection of a reflected light spot excepting that a plurality of the illuminators 24 is installed, unlike the known technique taught in the above patent document 3. This enables prevention of erroneous detection of a reflected light spot at a low cost, without an increase in size of the apparatus.

Further, the spot detector 25 of the reflected light detector 22 of the reflected light detecting apparatus 20 extracts positions of spots from the image 43 and holds these positions as the extracted spot list 25a, and the reflected light spot verification section 26 determines whether or not each spot in the image 43 is reflected light on the basis of positions of spots held in the extracted spot list 25a and the reflected light spot check list 26a set beforehand as arrangement positions of the plural illuminators 24. As this, it is possible to prevent erroneous detection of reflected light with certainty.

On this occasion, the reflected light spot verification section 26 compares each spot in the extracted spot list 25a extracted by the spot detector 25 with every reflected light spot in the reflected light spot check list 26a. When coinciding, this spot is determined to be a reflected light spot. When not coinciding, this spot is determined not to be a reflected light spot. Accordingly, each of all spots detected by the spot detector 25 is determined to be a reflected light spot or not, whereby reflected light spots can be detected, with certainty. Namely, it is possible to prevent erroneous detection of reflected light by means of the reflected light spot verification section 26, more certainly.

The reflection determination section 27 of the reflected light detecting apparatus 20 determines that the verification object 2 in the image 43 is a reflecting object when the number of reflected light spots detected from the image 43 by the reflected light detector 22 is equal to or larger than a predetermined number, while determining that that verification object 2 is a non-reflecting object when the number of reflected light spots detected by the reflected light detector 22 is smaller than the predetermined number. Accordingly, it is possible to determine, with certainty, whether the verification object 2 is a reflecting object or a non-reflecting object.

Even in the reflected light detecting apparatus 20, there is a possibility that, when a spot, due to unexpected disturbance light, appears at the same or almost same position as a reflected light spot of the illuminator 24, the reflected light spot verification section 26 erroneously determines that this spot is a reflected light spot. In the reflected light detecting apparatus 20, the photographing section 21 has a plurality (here, eight) of the illuminators 24a to 24h. For this, when the verification object 2 is a non-reflecting object (that is, when no reflected spots exist in the image 43, it hardly happens in reality that the reflected light spot verification section 26 erroneously detects disturbance light spots at positions in number equal to or larger than a predetermined number (seven).

As stated above, in the reflected light detecting apparatus 20, providing a plurality of the illuminators 24a to 24h allows the reflection determination section 27 to make more reliable determination. Namely, owing to the plural illuminators 24a to 24h, the reflection determination section 27 can give a decision that the verification object 2 is a reflecting object when reflected light spots in number equal to or larger than a predetermined number are detected. Whereby, it is possible to largely reduce the rate of occurrence of erroneous determination by the reflection determination section 27 (particularly, erroneous determination that the reflecting determination section 27 mistakes a non-reflecting object for a reflection object).

Further, when a result of determination by the reflection determination section 2 indicates that the verification object 2 is a reflecting object, the object propriety/impropriety judgment section 30 of the reflection characteristic determining apparatus 10 of the reflection characteristic judgment system 1 judges that the verification object 2 is a predetermined object, while judging that the verification object 2 is not the predetermined object when a result of determination by the reflection determination section 27 indicates that the verification object 2 is a nonreflecting object. Therefore, it is possible to certainly check propriety/impropriety of the verification object 2 as a product by means of the object propriety/impropriety judgment section 30.

When the object propriety/impropriety judgment section 30 gives a decision a predetermined number of times that the verification object 2 is not a predetermined object, the warning section 31 of the reflection characteristic determining apparatus 10 gives warning to the outside. When a desired verification object 2 comes out as an undesired product because the manufacturing process of the product in the upstream of the reflection characteristic judgment system 1 stops or malfunctions, the warning section 31 gives warning to the outside, with certainty.

In the reflection characteristic judgment system 1 according to this embodiment, as the desired verification object, a reflecting object that reflects light is considered to be in the normal state (of the product). Alternatively, a non-reflecting object that does not reflect light may be considered to be the desired verification object.

[2] As to Second Embodiment of the Invention

Next, description will be made of an automatic door system 50 according to a second embodiment of this invention with reference to FIG. 12.

Figure 12:
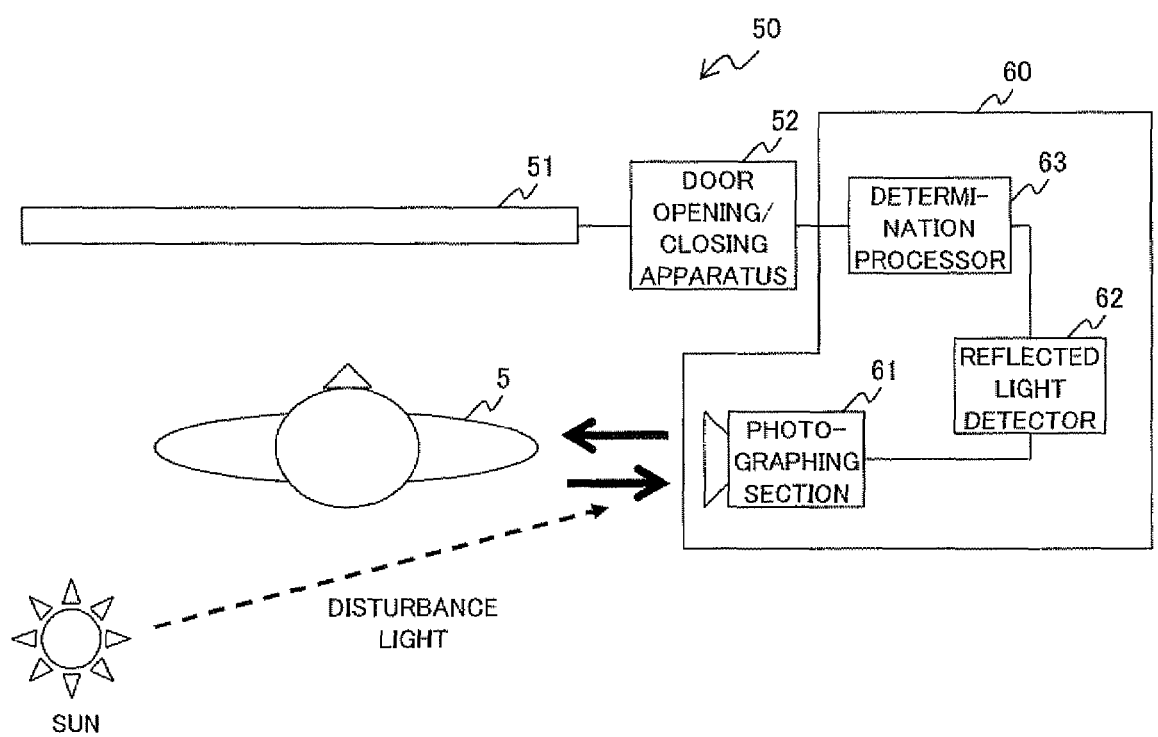
FIG. 12 Diagram for illustrating a configuration of an automatic door system according to a second embodiment of this invention.

As shown in FIG. 12, the automatic door system 50 has a door 51, a door opening/closing apparatus 52 and a reflected light detecting apparatus 60.

In the automatic door system 50, when the reflected light detecting apparatus 60 acting as an object detecting apparatus having a function of detecting an object (verification object) detects a verification object (here, a man or the like) 5, the door opening/closing apparatus 52 opens the door 51 on the basis of a result of detection of the verification object 5 by the reflected light detecting apparatus 60.

Namely, the door opening/closing apparatus 52 opens the door 51 when the reflected light detecting apparatus 60 detects the verification object 5.

The opening/closing apparatus 52 closes the door 51 when the reflected light detecting apparatus 60 does not continuously detect the verification object 5 for a predetermined period of time.

The reflected light detecting apparatus 60 has a photographing section 61, a reflected light detector (detector) 62 and a determination processor (determination section) 63.

Figure 13:
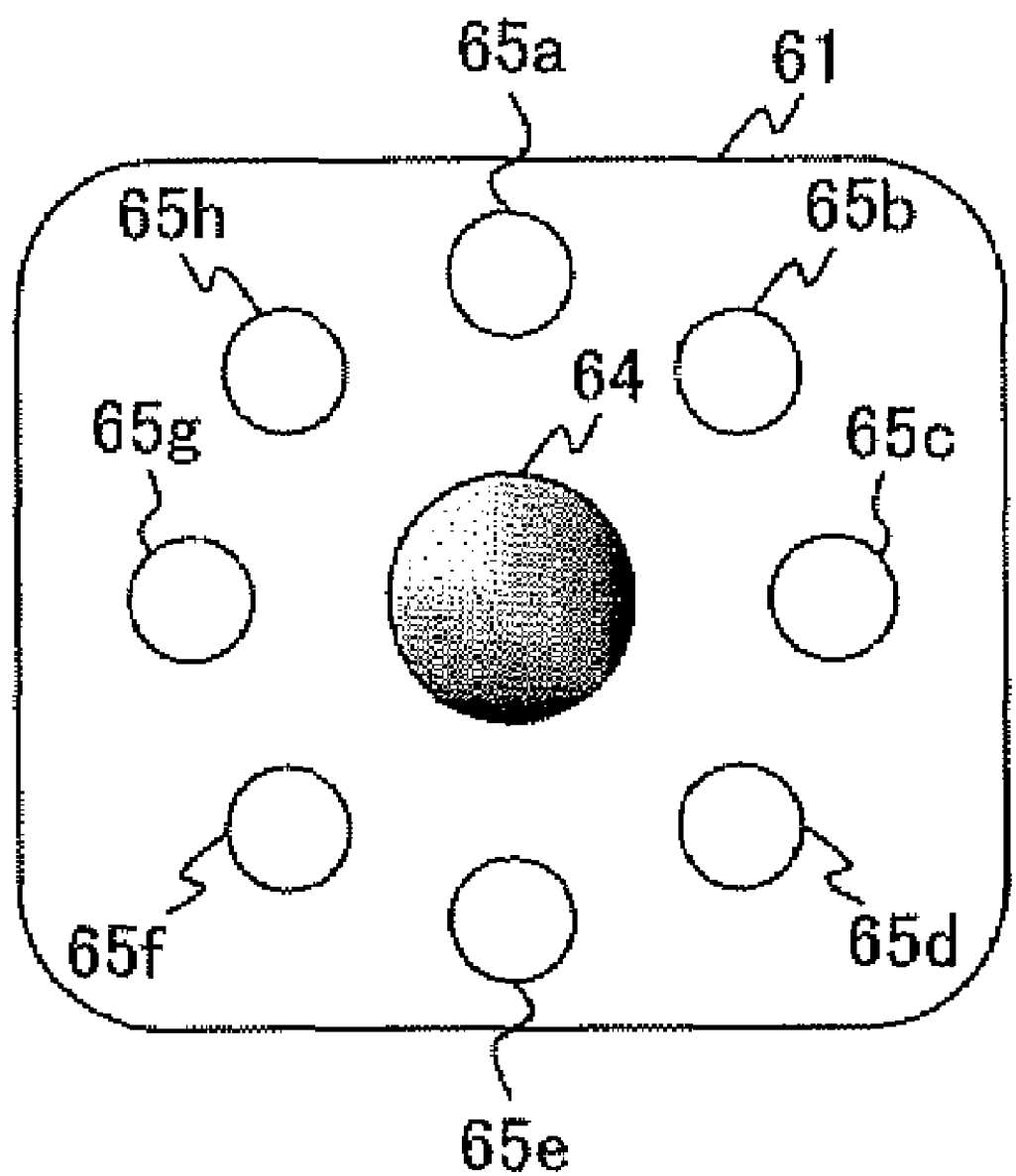
FIG. 13 Diagram for illustrating a configuration of a photographing section of a reflected light detecting apparatus of the automatic door system according to the second embodiment of this invention.

A photographing section 61 photographs a predetermined photographing range in a predetermined cycle while projecting light (illuminating), configured as shown in FIG. 13.

The photographing section 61 has an imaging device (photographing section) 64 and a plurality of illuminators (light-projectors) 65a to 65h.

The imaging device 64 photographs an object (for example, the verification object 5) within a predetermined photographing range in a predetermined cycle.

As the imaging device 64, practically used is a CCD imaging device, a CMOS imaging device or the like, like the imaging device 23 in the above-described first embodiment.

The plural illuminators 65a to 65h project beams of light parallel to or approximately parallel to the optical axis of the imaging device 64.

Each of these plural illuminators 65a to 65h is similar to the illuminator 24 in the above-described first embodiment.

In the reflected light detecting apparatus 60, these plural illuminators 65a to 65h (hereinafter, referred to simply as plural illuminators 65 when the plural illuminators 65a to 65h are not specifically discriminated from one another) are so arranged in a predetermined shape as to make a circle around the imaging device 64.

Each of the plural illuminators 65 irradiates spot light onto the photographing region in association with the imaging device 64 when the imaging device 64 photographs.

Figure 14:
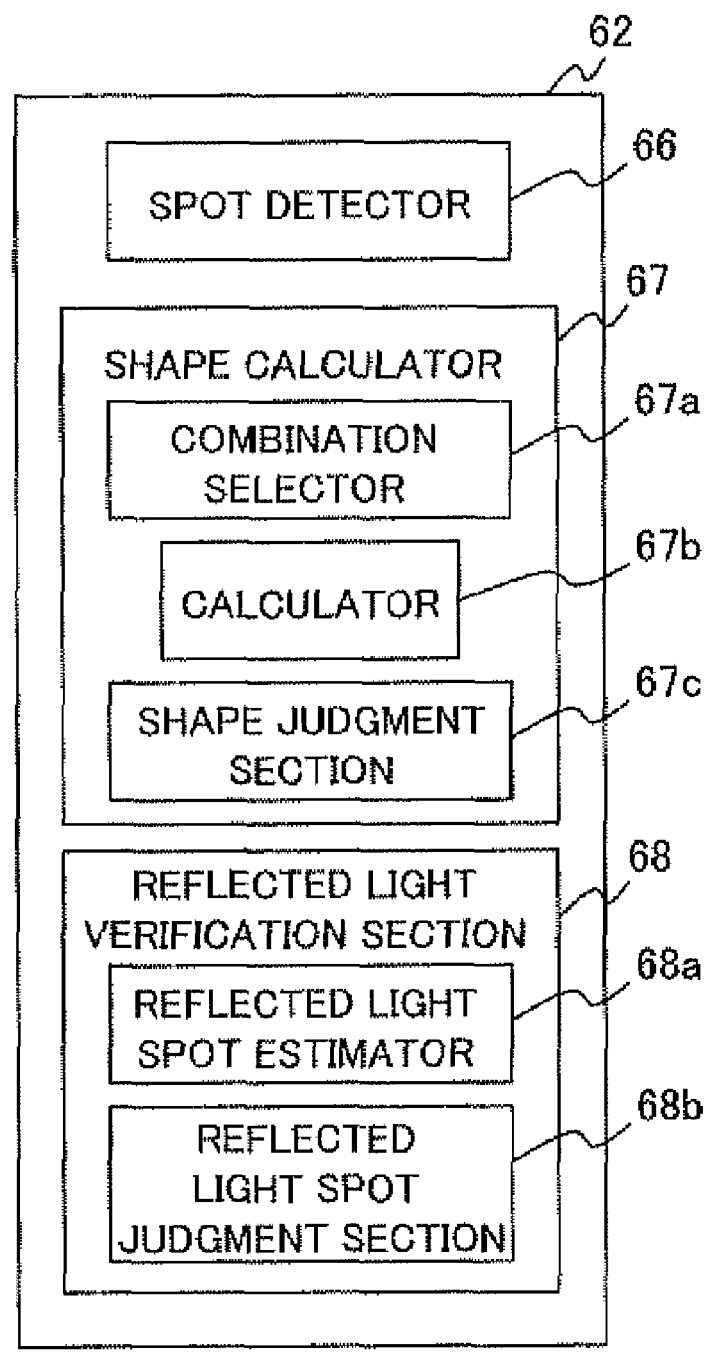
FIG. 14 Block diagram showing a configuration of a reflected light detector of the reflected light detecting apparatus of the automatic door system according to the second embodiment of this invention.

The reflected light detector 62 detects, from an image photographed by the imaging device 64, reflected light (reflection spots) from the plural projectors 65 reflected from the verification object, on the basis of a predetermined form (here, a circle) determined by arrangement positions of the plural illuminators 65 relative to the imaging device 64. As shown in FIG. 14, the reflected light detector 62 has a spot detector (extractor) 66, a shape calculator 67 and a reflected light verification section 68.

Figure 15:
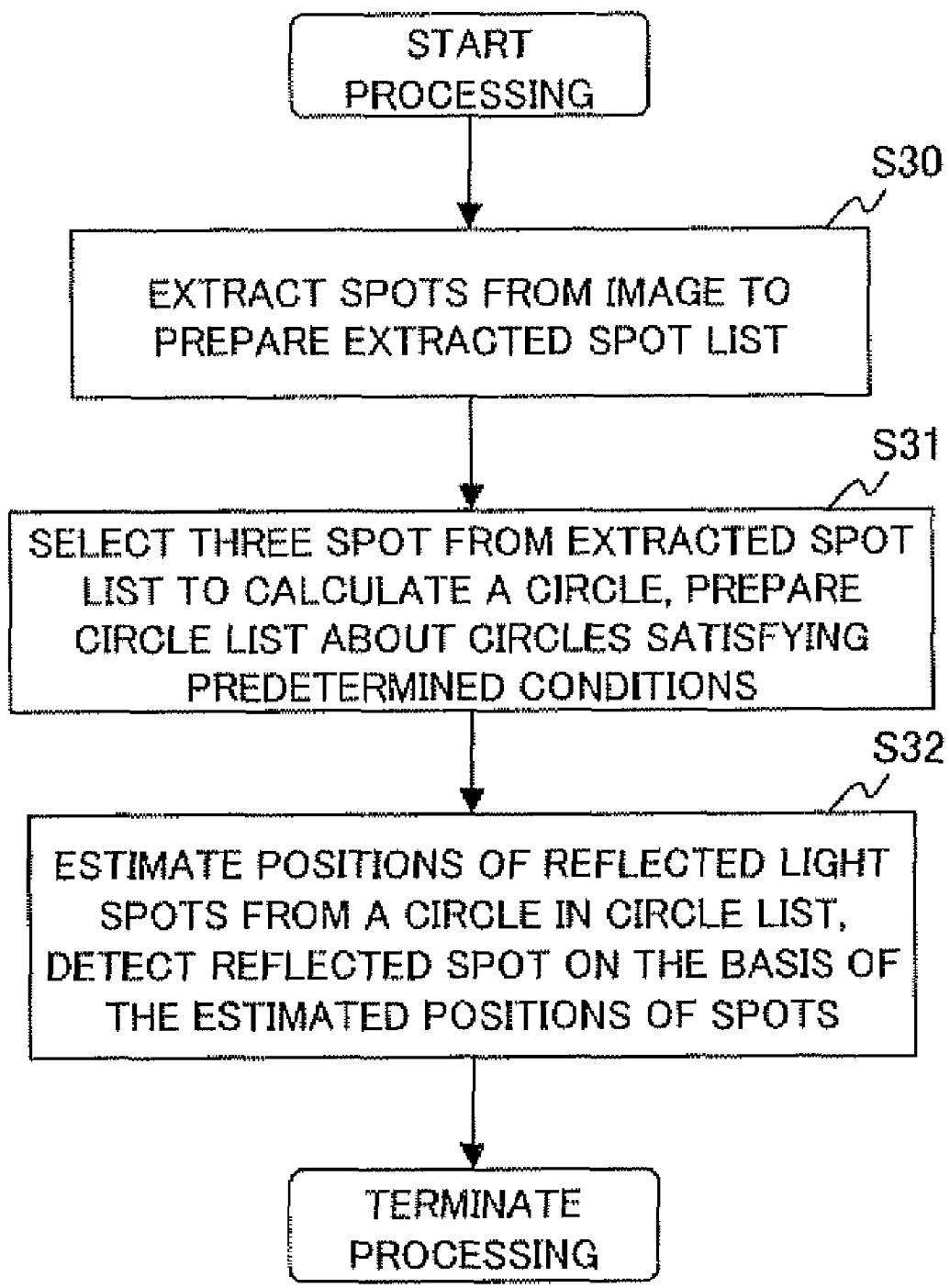
FIG. 15 Flowchart showing an example of operation procedure of the reflected light detector of the reflected light detecting apparatus of the automatic door system according to the second embodiment of this invention.

Now, description will be made of an operation procedure of the reflected light detector 62 with reference to a flowchart (steps S30 to S32) shown in FIG. 15. First, the spot detector 66 of the reflected light detector 62 extracts positions of spots from an image photographed by the imaging device 64, and lists the spots (refer to an extracted spot list 66a in FIG. 17 to be described later) (step S30).

Figure 21:
FIG. 21 Diagram showing an example of configuration of a circle list prepared by the shape judgment section of the shape calculator of the reflected light detector of the reflected light detecting apparatus according to the second embodiment of this invention.

Next, the shape calculator 67 selects a part (here, three) of the spots extracted by the spot detector 66, calculates a shape (here, a circle; extracted light shape) corresponding to a predetermined shape on the basis of the plural illuminators 65 determined from the selected spots, and prepares a list (refer to a circle list 67c-1 in FIG. 21 to be described later) about circles satisfying predetermined conditions (step S31).

When selecting three spots from all the spots extracted by the spot detector 66, the shape calculator 67 selects all selectable combinations, calculates a circle made by each of the selected combinations in order, and determines whether or not the circle satisfies the predetermined conditions (whether or not to add the circle to the list).

The reflected light verification section 68 estimates positions of the reflected light spots on the basis of a circle listed by the shape calculator 67, and detects reflected light spots from the image on the basis of predicted positions of the reflected light spots (step S32). On this occasion, the reflected light verification section 68 compares positions of the estimated reflected light spots with positions of spots in the extracted spot list 66a, thereby detecting reflected light spots from the image.

Now, configurations of the spot detector 66, the shape calculator 67 and the reflected light verification section 68 will be described more concretely.

The spot detector 66 extracts spots from an image photographed by the imaging device 64, configured the same or almost the same as the spot detector 25 in the above-described first embodiment.

Namely, the spot detector 66 performs the binarizing process on the image photographed by the imaging device 64 with a predetermined threshold value. The spot detector 66 then specifies a position (coordinates) of each spot in the binarized image (refer to FIGS. 4(a) through 4(c) mentioned above), and makes a list of the specified spots.

Figure 16:
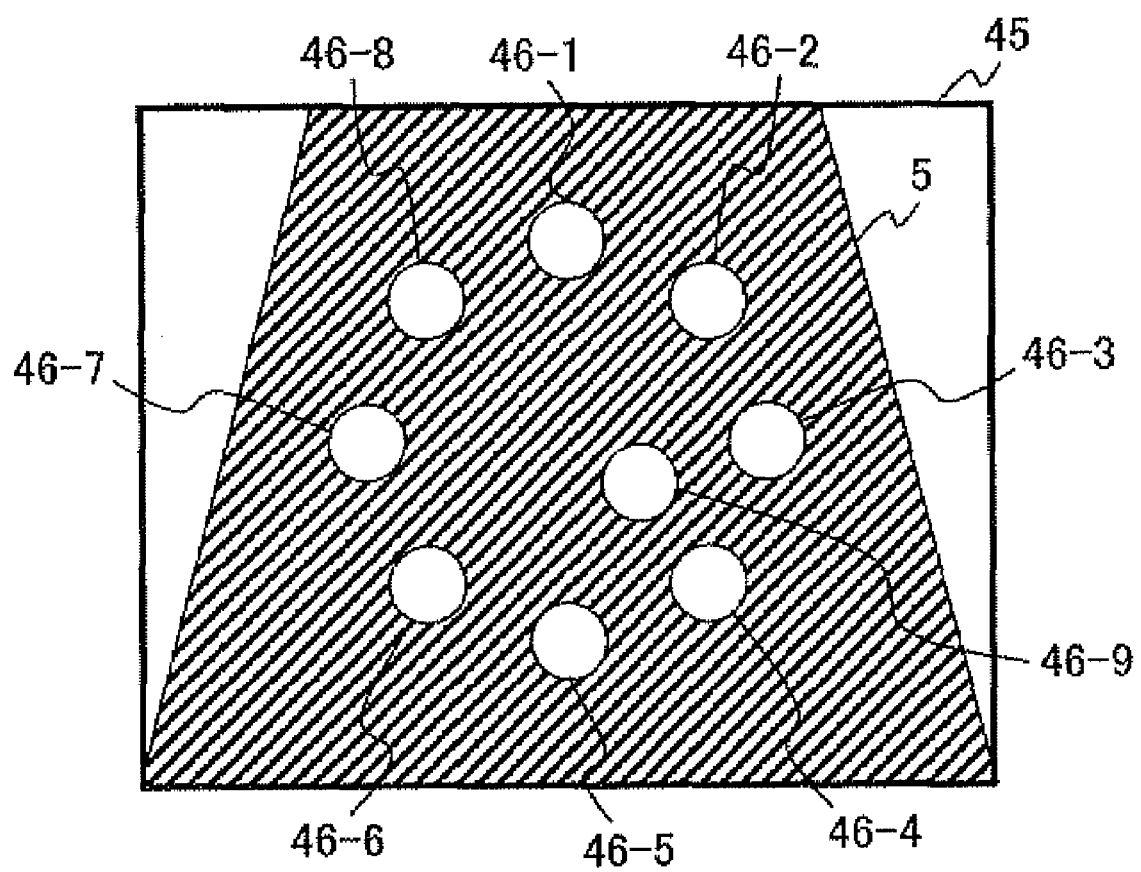
FIG. 16 Diagram showing an example of image photographed by a photographing section of the reflected light detecting apparatus of the automatic door system according to the second embodiment of this invention.

In this case, when the imaging device 64 photographs an image 45 shown in FIG. 16, for example, the spot detector 66 extracts positions of all the spots 46-1 to 46-9 in the bright area in the image 45. In FIG. 16, the spots 46-1 to 46-9 are schematically designated as circles.

In the image 45, a part designated by slanted lines represents the verification object 5, the spots 46-1 to 46-8 are reflected light (reflected light spots) of the illuminators 65a to 65h, respectively, and the spot 44-9 is disturbance light photographed in the image 45 because sunlight enters into the imaging device 64, as shown by a broken line in FIG. 12.

The spot detection section 66 prepares an extracted spot list (reflection spot candidate list) 66a shown in FIG. 17. Here, the left-bottom corner of the image 45 is assumed to be the origin (0,0) of the X coordinate and the Y coordinate.

In the extracted spot list 66a, the serial number (No.) "1" corresponds to the spot 46-1, the X coordinate and the Y coordinate of which are "25" and "33", respectively. The serial number "2" corresponds to the spot 46-2, the X coordinate and the Y coordinate of which are "34" and "32", respectively. The serial number "3" corresponds to the spot 46-3, the X coordinate and the Y coordinate of which are "39" and "20", respectively. The serial number "4" corresponds to the spot 46-4, the X coordinate and the Y coordinate of which are "34", and "12", respectively. The serial number "5" corresponds to the spot 46-5, the X coordinate and the Y coordinate are "25" and "9", respectively. The serial number "6" corresponds to the spot 46-6, the X coordinate and the Y coordinate of which are "17" and "13", respectively. The serial number "7" corresponds to the spot 46-7, the X coordinate and the Y coordinate of which are "12" and "21", respectively. The serial number "8" corresponds to the spot 46-8, the X coordinate and the Y coordinate of which are "16" and "28", respectively. The serial number "9" corresponds to the spot 46-9, the X coordinate and the Y coordinate of which are "30" and "17", respectively.

The shape calculator 67 calculates a circle determined by the plural illuminators 65 by using part of or all (here, a part (three)) of positions of spots extracted by the spot detector 66, and prepares a list (refer to the circle list 67c-1 in FIG. 21 to be described later) satisfying the predetermined conditions. As shown in FIG. 14, the shape calculator 67 has a combination selector 67a, a calculator 68b and a shape judgment section (third judgment section) 68c.

The combination selector 67a selects combinations of three spots to be applied to a circle, and hands the combinations to the calculator 68b. In concrete, the combination selector 67a selects all combinations of three spots from nine spots held in the extracted spot list 66a. Since nine spots are listed by the spot detector 66, the combination selector 67a makes 84 combinations in all.

The combination selector 67a combines three spots in the ascending order of serial numbers in the extracted spot list 66a, and outputs a combination according to an inputted combination number among the 84 combinations. Namely, the combination selector 67a is inputted with each of the combination numbers Z from 1 to 84, thereby outputting all the 84 combinations, as shown in a flowchart (step S40 to S56) in FIG. 18.

In concrete, the combination selector 67a sets an internal combination number z to "initialization" (that is, "1") (step S40), sets the first spot number (that is, the serial number in the extracted spot list 66a) f of three spots to "1" (step S41), sets the second spot number g of the three spots to "f+1" (step S42), and the third spot number h of the three spots to "g+1" (step S43).

The combination selector 67a then determines whether or not a desired combination number Z inputted from the outside coincides with an internal combination number z that is combined at present (that is, "z=Z" or not) (step S44).

When the internal combination number z coincides with the inputted desired combination number Z (Yes route at step S44), the combination selector 67a outputs three spots of the numbers set at the above steps S41 to S43 to the outside as a relevant combination (step S45). First, when the desired combination number Z inputted from the outside is "1", the combination selector 67a selects the serial numbers "1", "2" and "3" in the extracted spot list 66a, that is, the spots 46-1 to 46-3 in the image 45, and outputs these serial numbers.

On the other hand, when the internal combination number z does not coincide with the inputted desired combination number Z (No route at step S44), the combination selector 67a increments the internal combination number by one (step S46), and increments the third spot number of the three spots to be selected by one (step S47).

The combination selector 67a then determines whether or not the third spot number h after one increment is larger than the number of all spots whose positions are extracted by the spot detector 66 (that is, the number of all spots in the extracted spot list 66a) (step S48).

When the third spot number h is equal to or smaller than the number Q of all spots (No route at step S48), the combination selector 67a returns to the above step S44, and again executes the processes at the above steps S44 to S47.

On the other hand, when the third spot number h is larger than the number Q of all spots (Yes route at step S48), the combination selector 67a increments the second spot number g of the three spots to be selected by one (step S49), and updates the third spot number h to a value obtained by adding one to the spot number g updated at the above step S49 (step S50).

The combination selector 67a determines whether or not the second spot number g after one increment is larger than the number "Q-1" of all spots whose positions are extracted by the spot detector 66 (step S51).

When the second spot number g is equal to or smaller than the number "Q-1" of all spots (No route at step S51), the combination selector 67a returns to the above step S43, and again executes the processes at the above steps S43 to S50.

On the other hand, when the second spot number g is larger than the number "Q-1" of all spots (Yes route at step S51), the combination selector 67a increments the first spot number f of three spots to be selected by one (step S52), updates the second spot number g to a value obtained by adding one to the first spot number updated at the above step S52 (step S53), and updates the third spot number h to a value obtained by adding one to the second spot number g updated at the above step S53 (step S54).

The combination selector 67a then determines whether or not the first spot number f updated at the above step S54 is larger than the number "Q-2" of all spots whose positions are extracted by the spot detector 66 (step S55).

When the first spot number f is equal to or smaller than the number "Q-2" of all spots (No route at step S55), the combination selector 67a returns to the above step S42, and again executes the processes at the above steps S42 to S54.

On the other hand, when the first spot number f is larger than the number "Q-2" of all the spots (Yes route at step S55), the combination selector 67a determines that there is not a combination corresponding to the inputted desired combination number z (step S56), and terminates the process.

As this, the combination selector 67a outputs a combination according to the inputted combination number Z to the calculator 67b.

Each time the combination selector 67a selects three spots, the calculator 67b calculates a circle (extracted light shape) formed by these three spots.

Meanwhile, a circle can be expressed as;

$$r^2 = (x-a)^2 + (y-b)^2 \qquad (2)$$

Where the radius of the circle is "r", the X coordinate of the center of the circle is "a" and the Y coordinate of the same is "b".

The calculator 67b substitutes each of positions (X coordinates and Y coordinates) of three spots selected by the combination selector 67a in "x" and "y" in the above equation (2), calculates a circle by solving the obtained three simultaneous equations to calculate the radius and the center coordinates (a,b) of the circle.

In the automatic door system 50, since the plural illuminations 65 are so arranged as to form a circle, the combination selector 67a selects three spots, the calculator 67b substitutes each of positions of the selected three spots in the above equation (2) to calculate the circle, as above.

Figure 19:
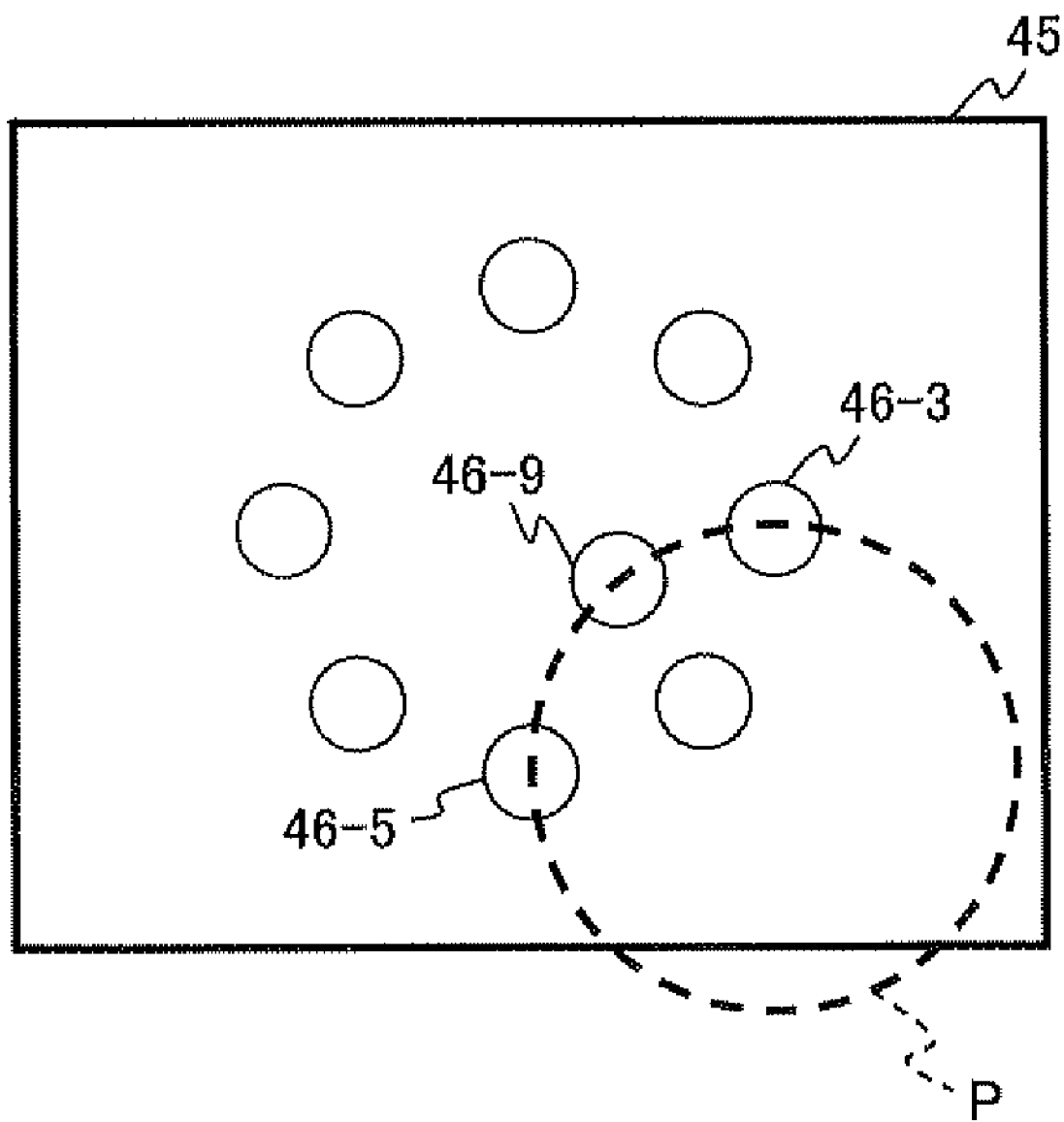
FIG. 19 Diagram showing an example of circle calculated by a calculator of the shape calculator of the reflected light detector of the reflected light detecting apparatus according to the second embodiment of this invention.

When the combination selector 67a selects the spots 46-3, 46-5 and 46-9 as shown in FIG. 19, for example, the calculator 67b calculates a radius and center coordinates of the circle designated by a broken line P.

In this invention, the predetermined shape formed by the plural illuminators 65 is not limited. However, as the extracted light shape to be calculated by the calculator 67b, the predetermined shape is preferably a circle, whereby, the calculator 67b can calculate, the extracted light shape on the basis of the equation (2), easily and quickly.

Meanwhile, the calculator 67b calculates circles for all combinations (here, 84 combinations) selected by the combination selector 67a.

The shape judgment section 67c judges whether or not positions and sizes of a circle calculated by the calculator 67b and a predetermined shape (here, a circle) determined by the plural illuminators 65 coincide with each other.

Here, "coincide" does not necessarily mean that they completely agree, but means that they satisfy predetermined conditions, that is, they agree within a range of predetermined error as will be mentioned later.

In the automatic door system 50, the distance between the verification object 5 and the imaging device 64 is not constant, hence the distance varies according to a position through which the verification object 5 passes. For this reason, the size of a circle formed by reflected light spots of the plural illuminations 65 reflected from the verification object 5 in the image photographed by the imaging device 64 is not constant, but varies.

Accordingly, the shape judgment section 67c sets beforehand a permissible range of the size and the center position of a circle formed by reflected light spots in the image, on the basis of a circle determined by the plural illuminations 65 and a position estimated when the verification object 5 passes through the automatic door, and judges that a circle within this permissible range coincides with a circle determined by the plural illuminators 65.

In other words, before a reflected light spot estimator 68a to be described later estimates positions of reflected light spots in the image 45 on the basis of a circle calculated by the calculator 67b, the shape judgment section 67c deletes obviously inappropriate circles in this stage.

Figure 20A:
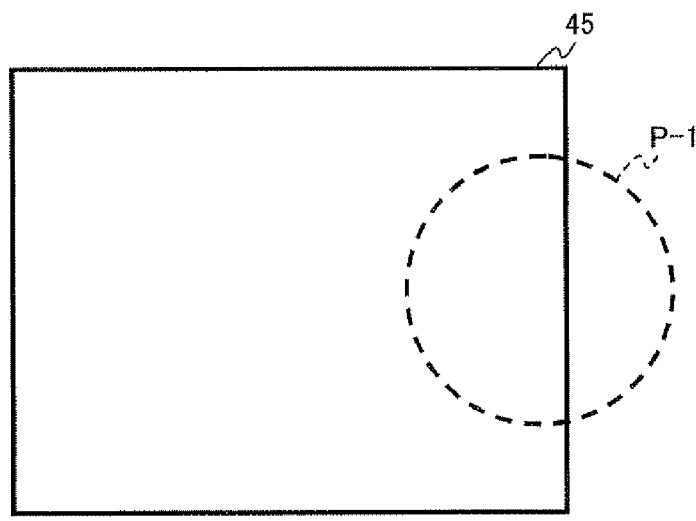
FIG. 20 Diagrams for illustration a judgment process by a shape judgment section of the shape calculator of the reflected light detector of the reflected light detecting apparatus according to the second embodiment of this invention, wherein (a) to (c) are diagrams showing an example of circle used by the shape judgment section to determine that the circle is an inappropriate circle.
Figure 20B:
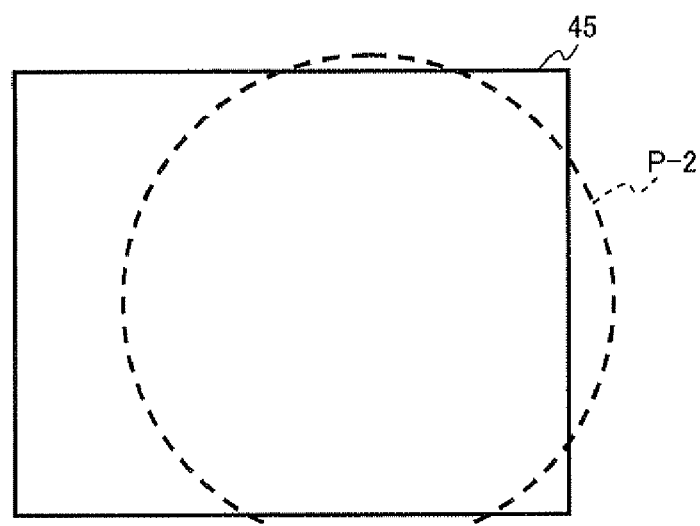
Figure 20C:
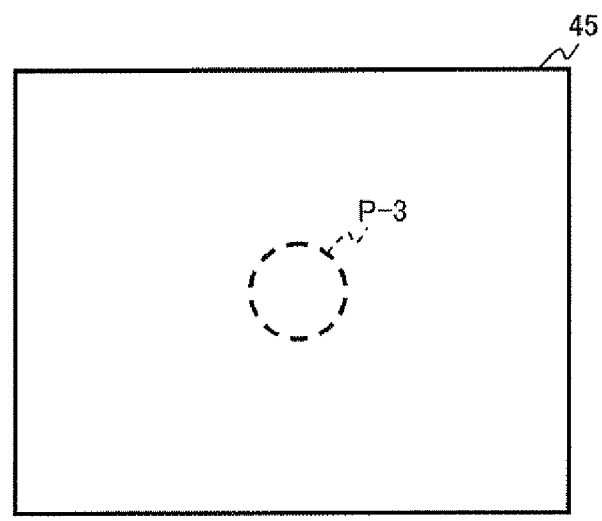

For example, the shape judgment section 67c judges, as inappropriate circles, a circle P-1 whose center position is largely shifted as shown in FIG. 20(a), a circle P-2 whose radius is excessively large as shown in FIG. 20(b), and a circle P-3 whose radius is excessively small as shown in FIG. 20(c).

When a circle calculated by the calculator 67b is based on the spot 46-9 (that is, when the spot 46-9 is included in three spots selected by the combination selector 67a), the shape judgment section 67c judges that this circle is an inappropriate circle that does not coincide with a circle determined by the plural illuminators 65.

The shape decision section 67c adds circles each coinciding with a circle determined by the plural illumination 65 to a circle list 67c-1, in order.

Namely, each time a circle is calculated by the calculator 67b, the shape judgment section 67c performs the above-mentioned coincidence determination process, and adds the radius and the center coordinates of a circle found to coincide to the circle list 67c-1, and prepares the circle list 67c-1 of circles satisfying the predetermined conditions of all circles calculated by the calculator 67.

Figure 22:
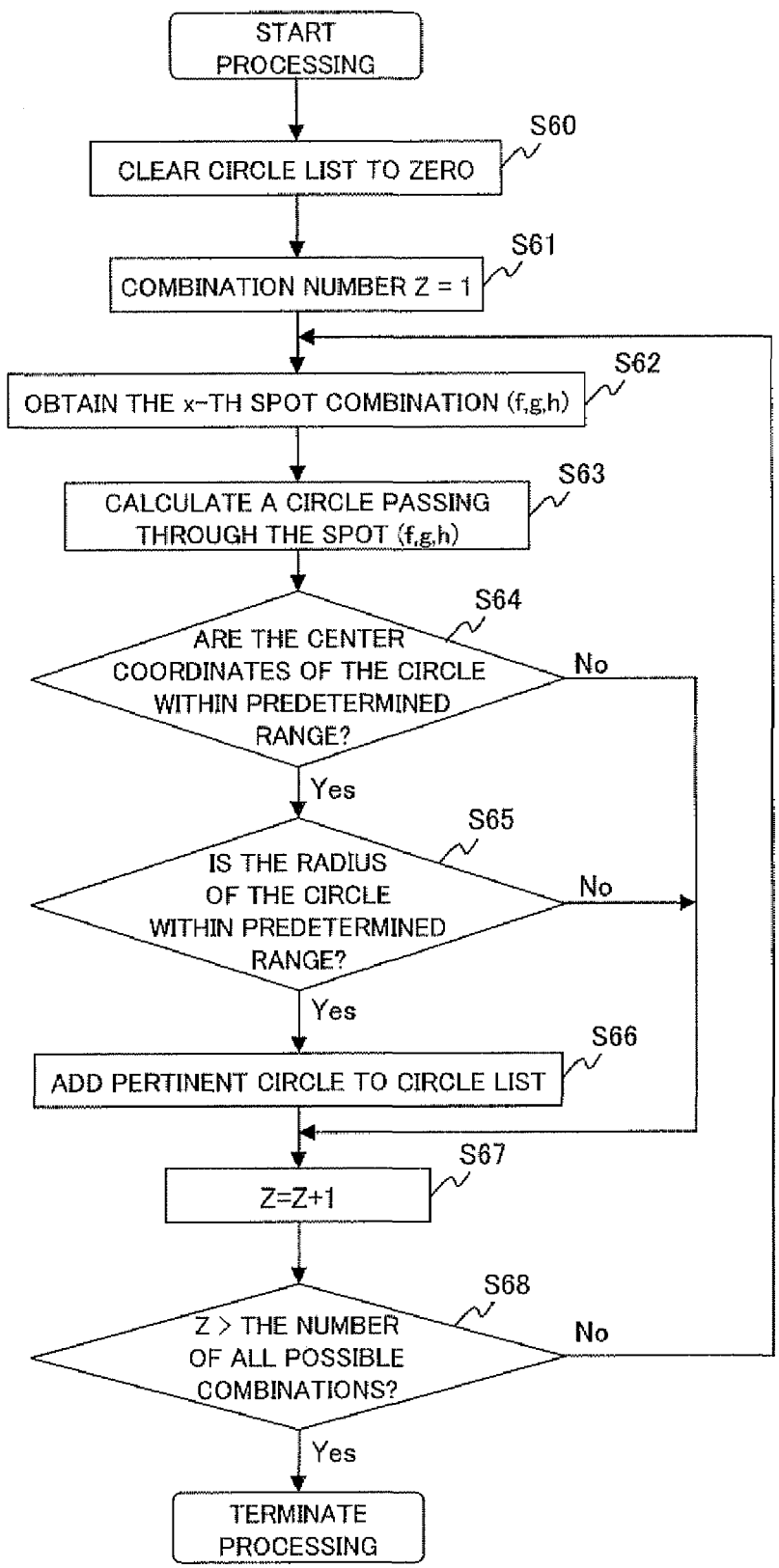
FIG. 22 Flowchart showing an example of operation procedure of the shape calculator of the reflected light detector of the reflected light detecting apparatus according to the second embodiment of this invention.

Now, an operation procedure for preparing the circle list 67c-1 by the shape calculator 67 (that is, the combination selector 67a, the calculator 67b and the shape judgment section 67c), with reference to a flowchart (steps S60 to S68) shown in FIG. 22.

First, the shape calculator 67 deletes all data in the circle list 67c-1 to reset the same (step S60).

Next, the shape calculator 67 causes the combination selector 67a to select three spots from the extracted spot list 66a. In order to cause the combination selector 67a to select combination numbers in the ascending order, beginning with the first combination, the shape calculator 67 designates the combination number "Z" as "1" (Step S61).

Figure 18:
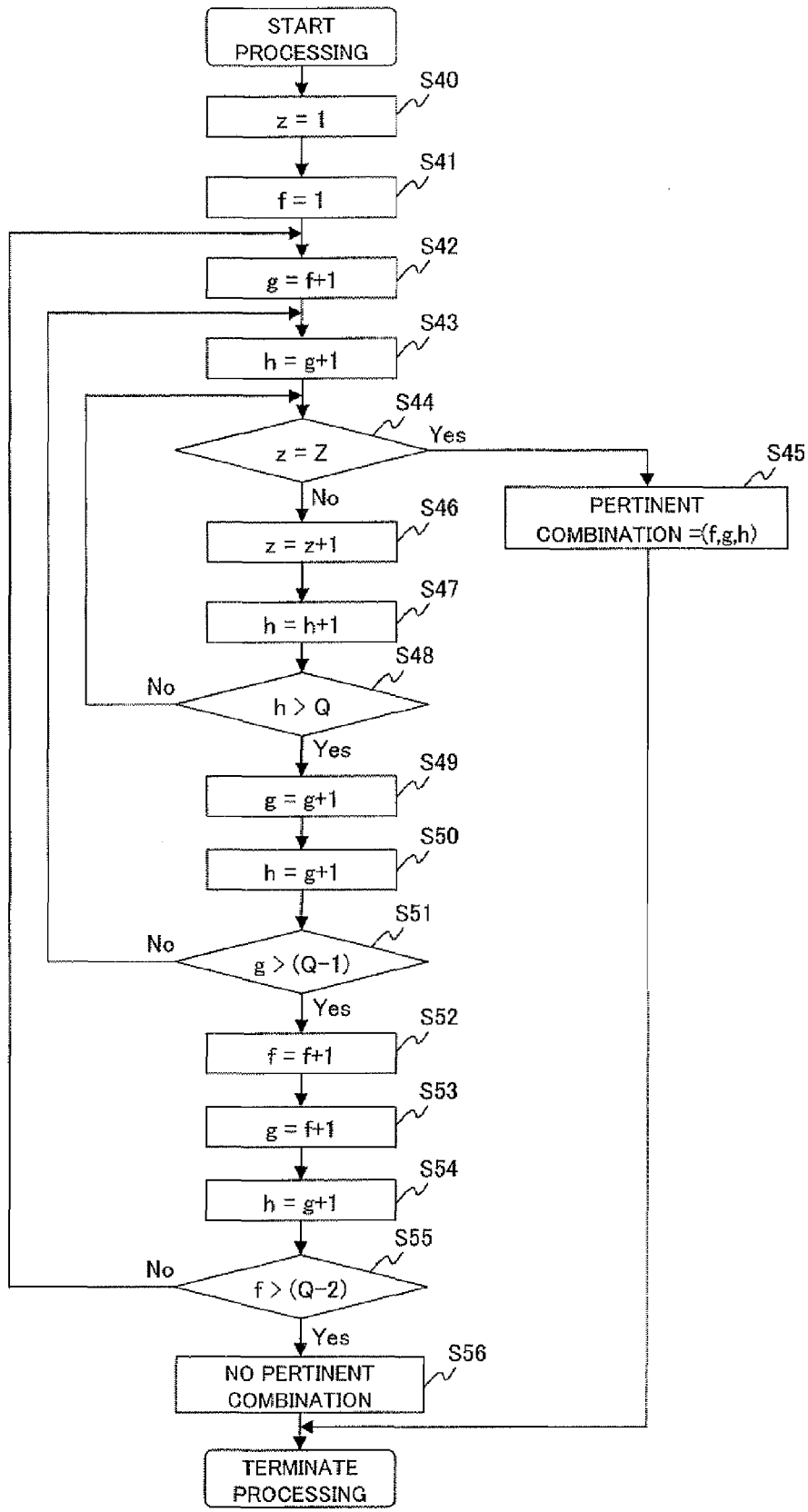
FIG. 18 Flowchart showing an example of operation procedure of a combination selector of a shape calculator of the reflected light detector of the reflected light detecting apparatus according to the second embodiment of this invention.

The combination selector 67a executes selection of the first spot combination (f,g,h) according to the flowchart shown in FIG. 18 described above (step S62).

The calculator 67b calculates a circle passing through the three spots selected by the combination selector 67a (step S63).

In order to judge whether or not the circle calculated by the calculator 67b coincides with a circle determined by the plural illuminators 65, the shape judgment section 67c first judges whether or not the center coordinates of this circle are within the predetermined range (step S64).

When judging that the center coordinates of the circle calculated by the calculator 67b at the above step S63 are not within the predetermined range (that is, when the center coordinates do not coincide with those of the circle determined by the plural illuminators 65) (No route at step S64), the shape judgment section 67c skips the steps S65 and S66 to be described later without performing the processes thereat, and goes to a process at step S67 to be described later.

When judging that the center coordinates of the circle calculated by the calculator 67b at the above step S63 are within the predetermined range (that is, when the center coordinates coincide with those of the circle determined by the plural illuminators 67) (Yes route at step S64), the shape judgment section 67c further judges whether or not the radius of this circle is within a predetermined range (step S65).

When judging that the radius of the circle calculated by the calculator 67b at the above step S63 is not within the predetermined range (that is, when the radius does not coincide with that of the circle determined by the plural illuminators 65) (No route at step S65), the shape judgment section 67c skips a process at S66 to be described later without performing the same, and goes to a process at step S67 to be described later.

On the other hand, when judging that the radius of the circle calculated by the calculator 67b at the above step S63 is within the predetermined range (that is, the radius coincides with that of the circle determined by the plural illuminators 65) (Yes route at step S65), the shape judgment section 67c judges that the circle calculated by the calculator 67b coincides with the circle determined by the plural illuminators 65, and adds this circle calculated by the calculator 67b to the circle list 67c-1 (step S66).

The shape calculator 67 increments the combination number Z by one (step S67), and determines whether or not the incremented value is larger than the number of combinations (here, "84") selectable by the combination selector 67a (step S68). When determining that the value is not larger (No route at step S68), the procedure returns to the process at the above step S62.

On the other hand, when determining that the value updated at the above step S67 is larger than the number of combinations selectable by the combination selector 67a (Yes route at step S68), the shape calculator 67 terminates the process.

Next, described is the reflected light verification section 68. The reflected light verification section 68 estimates reflected light spots in the image 45 on the basis of a circle retained in the circle list 67c-1 prepared by the shape calculator 67, determines whether or not the estimated reflected light spots are correct, and verifies whether or not the reflected light spots of light from the plural illuminators 65 reflected by the verification object 5 in the image exist. As shown in FIG. 14, the reflected light verification section 68 has a reflected light spot estimator (estimator) 68a, and a reflected spot judgment section (fourth judgment section) 68b.

The reflected spot estimator 68a estimates positions of reflected light spots of the plural illuminators 65 in the image 45, on the basis of circles in the circle list 67c-1 judged by the shape judgment section 67c that these circles coincide with a circle determined by the plural illuminators 64, and arrangement positions of the plural illuminators 65 relative to the imaging device 64.

Figure 23:
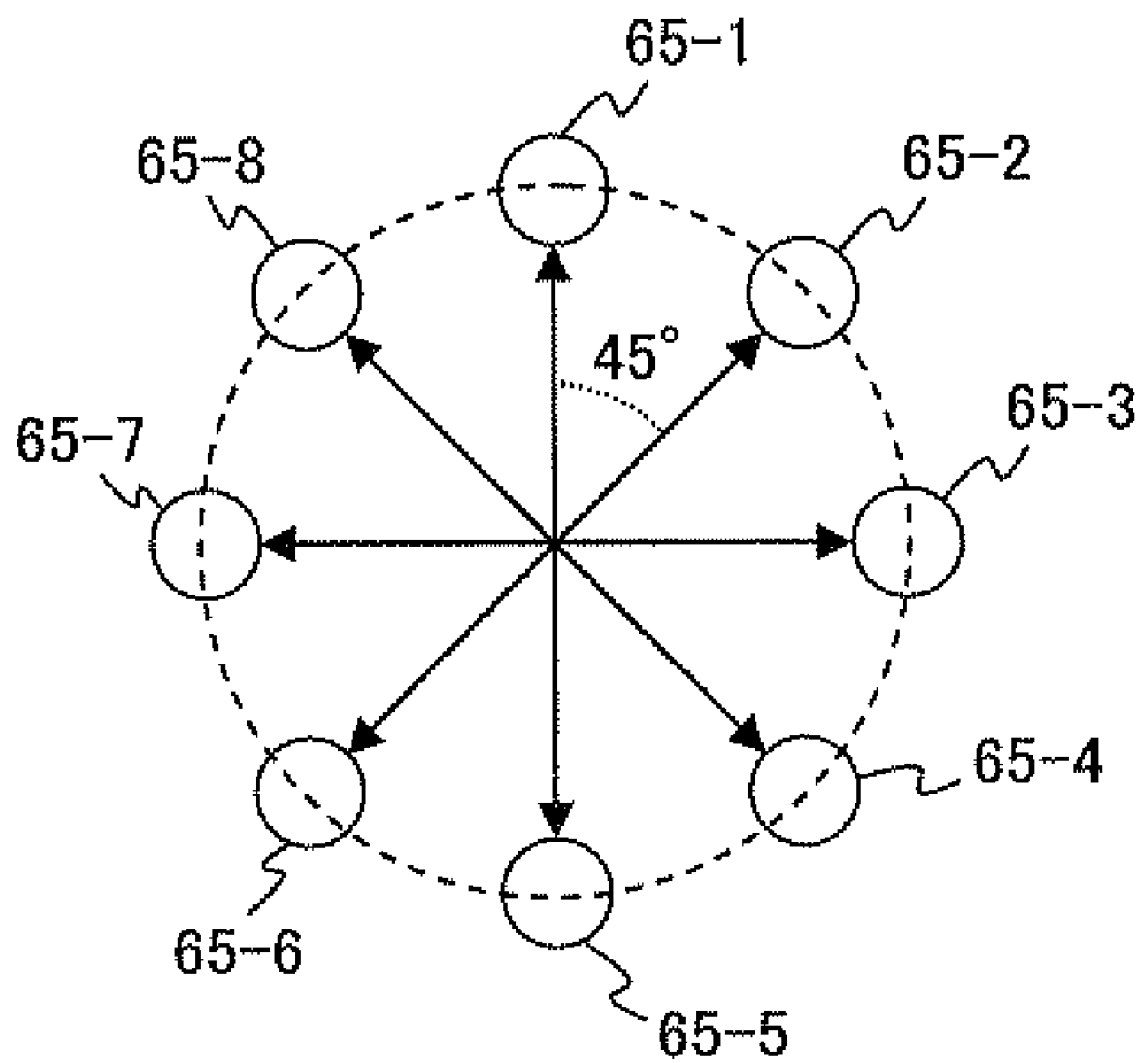
FIG. 23 Diagram for illustrating a process of estimating positions of reflected light spots by a reflected light spot estimator of a reflected light verification section of the reflected light detector of the reflected light detecting apparatus according to the second embodiment of this invention.

Since each of the plural illuminators 75 is arranged so as to form a circle with the imaging device 64 located in the center as shown in FIG. 13, the reflected light spot estimator 68a estimates that eight positions corresponding to positions of the plural illuminators 65 relative to the imaging device 64 on the circumference of a circle retained in the circle list 67c-1 are positions of the reflected light spots. Namely, the reflected light spot estimator 65a estimates that positions on the circumference are the reflected light spots 65-1 to 65-8 of the plural illuminators 65 when the circle is equally divided into eight, as shown in FIG. 23.

The reflected light spot estimator 68a retains positions of the estimated eight reflected light spots 65-1 to 65-8 as a reflected light spot check list (not shown). That is, like the reflected light spot verification section 26 of the reflected light detecting apparatus 20 in the above-described first embodiment, the reflected light spot estimator 68a prepares the reflected light spot check list similar in structure to the reflected light spot check list 26a shown in FIG. 7.

The reflected light spot judgment section 68b compares the positions of the reflected light spots 65-1 to 65-8 estimated by the reflected light spot estimator 68a with positions of plural spots extracted by the spot detector 66, and judges that coinciding one is a true reflected light spot.

Like the reflected light spot verification section 26 of the reflected light detecting apparatus 20 in the above-described first embodiment, the reflected light spot judgment section 68b verifies as to whether or not each spot retained in the extracted spot list 66a is a reflected light spot in the same procedure shown in the flowchart (steps S1 to S10) in FIG. 8 as described above, and, when a spot in the extracted spot list 66a coincides with any one of the reflected light spots in the reflected spot check list, sets the check-up information of the relevant reflected light spot 65-1, 65-2, . . . or 65-8 in the reflected spot check list to "1".

As shown in FIG. 12, a determination processor 63 determines that the verification object 2 exists when the reflected light detector 62 detects reflected light spots from the image 45, and outputs a signal to the door opening/closing apparatus 52 in order to open the door 51. When no reflected light spots are detected, the determination processor 63 determines that the verification object 5 does not exist. Here, when the reflected light spot judgment section 68b detects reflected light spots in number larger than a predetermined number (here, seven) from the image 45, the determination processor 63 determines that the verification object 5 exists. When the number of the reflected light spots detected from the image 45 is smaller than the predetermined number, the determination processor 63 determines that the verification object 5 does not exist.

When determining that the verification object 5 does not exist, the determination processor 63 does not output a signal to open/close the door 51 to the door opening/closing apparatus 52.

In concrete, the determination processor 63 counts the number of pieces of check-up information that are set at "1", in the reflected light spot check list prepared by the reflected light spot judgment section 68b, and determines that the verification object 5 exists when the counted value is equal to or larger than "7".

A larger number set for the above predetermined number serving as a threshold value used for a judgment as to the presence/absence of the verification object 5 by the verification processor 63 makes the system possible to be more sustainable to the disturbance light. (that is, a probability that the system mistakes a disturbance light spot for reflected light spot decreases). However, unless light of the illuminators 65 reflected from the verification object 5 returns to the photographing range of the imaging device 64 at a high rate, the system cannot give a decision that the verification object 5 exists, leading to a high possibility that the system makes an erroneous determination that the verification object 5 does not exist although the verification object 5 exists.

Conversely, when the above predetermined number is decreased, the system is prone to make an erroneous detection due to disturbance light, but is easier to detect the verification object 5 (that is, prone to determine that the verification object 5 exists).

Therefore, it is preferable to determine the above predetermined value that is a threshold value to determine presence/absence of the verification object 5, according to circumstances of the site of the automatic door system 50 such as conditions of photographing and so forth.

Figure 24:
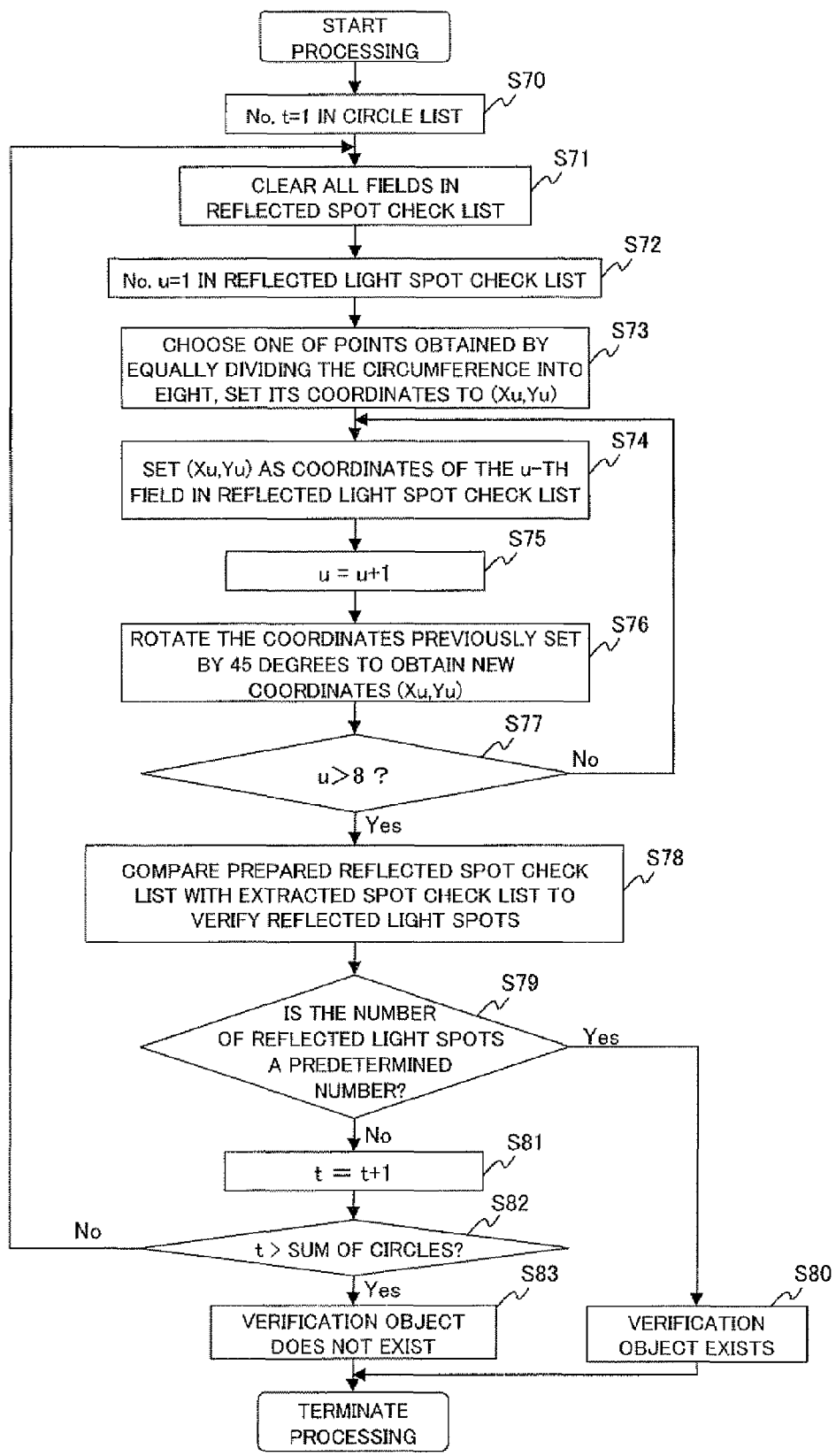
FIG. 24 Flowchart showing an example of operation procedure of a process of determining presence/absence of a verification object by the reflected light verification section and a determination processor of the reflected light detector of the reflected light detecting apparatus according to the second embodiment of this invention.
Figure 25:
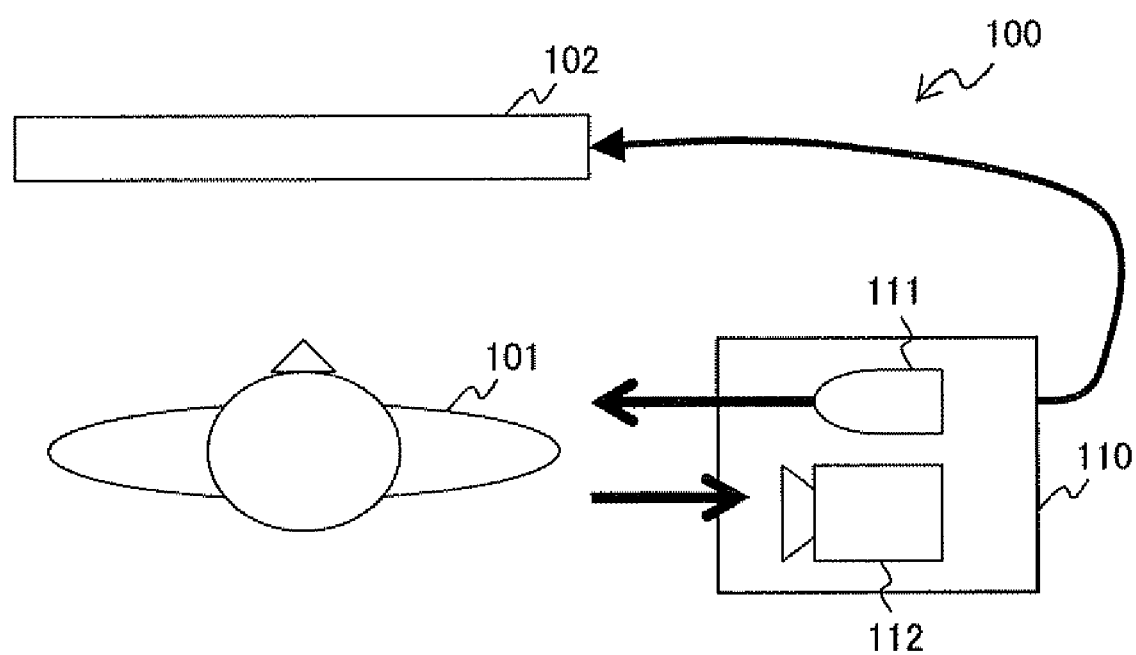
FIG. 25 Diagram for illustrating an example of configuration of a known automatic door system.
Figure 26A:
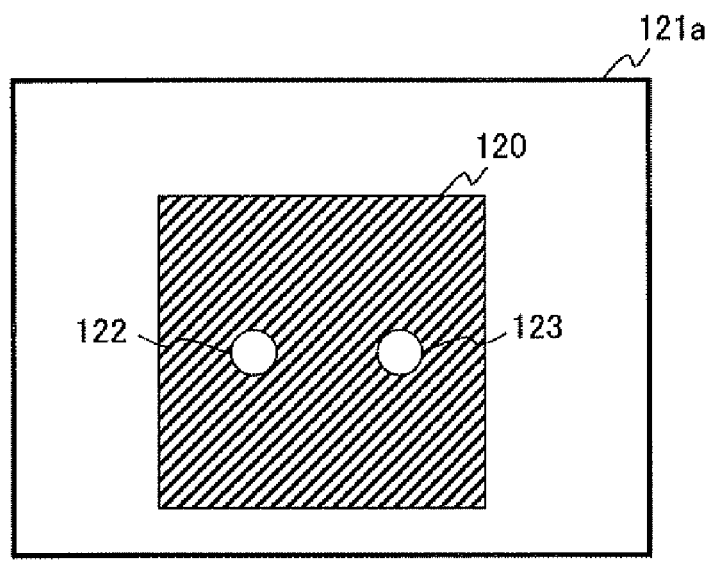
FIG. 26 Diagrams showing images of a verification object whose surface reflects light, photographed while two illuminators irradiate light thereon, wherein (a) is a diagram showing an image when disturbance light does not exist, and (b) is a diagram showing an image when disturbance light exists.
Figure 26B:
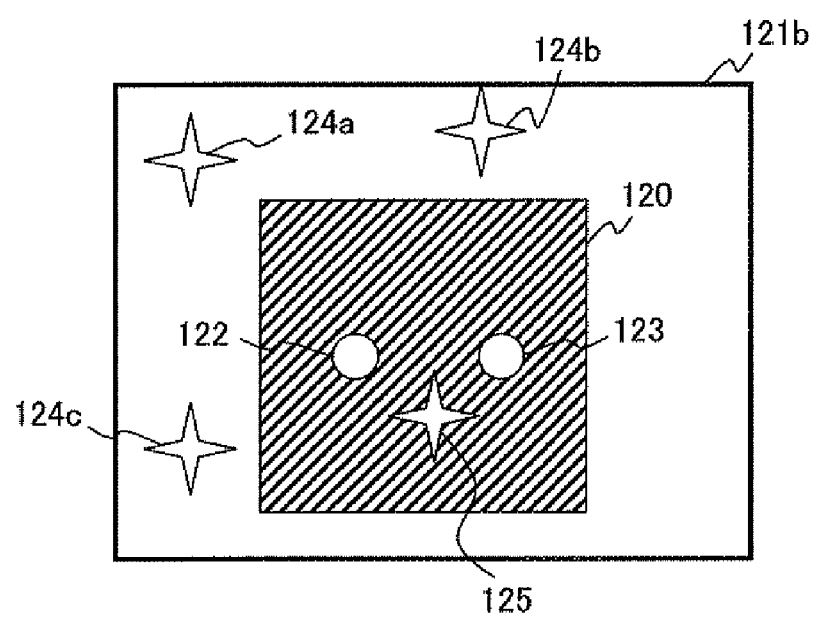
Figure 27A:
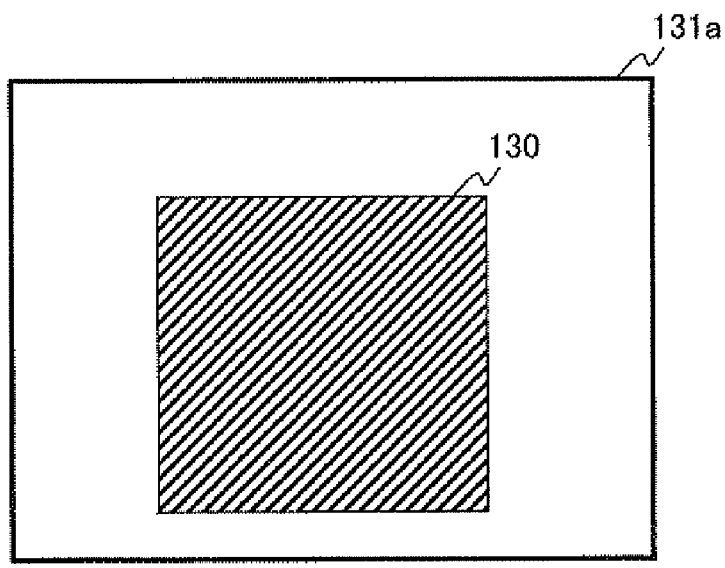
FIG. 27 Diagrams showing images of a verification object whose surface does not reflect light, photographed while illumination is irradiated thereon, wherein (a) is a diagram showing an image when disturbance light does not exist, and (b) is a diagram showing an image when disturbance light exists.
Figure 27B:
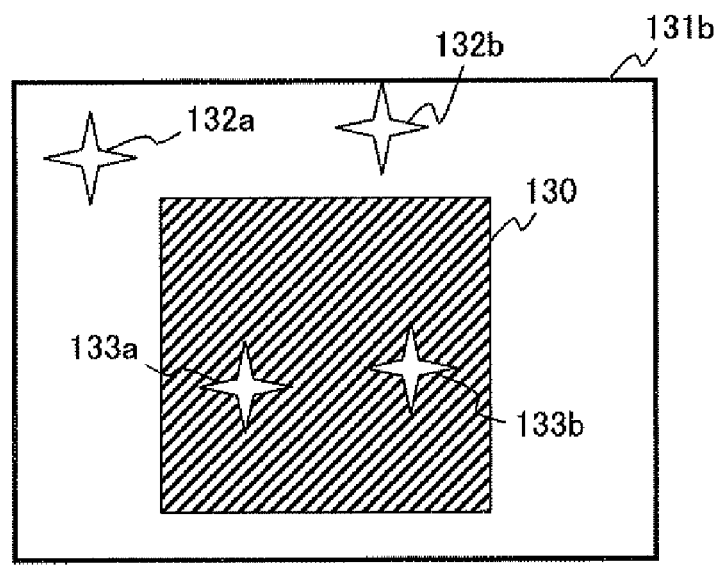

Now, procedure for determining presence/absence of the verification object 5 executed by the reflected light verification section 68 of the reflected light detector 62 in association with the determination processor 63 (operation procedure of the reflected light detection section 68 and the determination processor 63) will be described with reference to a flowchart (steps S70 to S83) shown in FIG. 24.

First, the reflected light spot estimator 68a of the reflected light verification section 68 sets the value of a serial number t in the circle list 67c-1 to "1" in order to process the serial numbers in the circle list 67c-1 in the ascending order, beginning with the serial number 1 (step S70). The reflected light spot verification section 68b clears all fields in the reflected light spot check list to reset the same (step S71), and sets a serial number u in the reflected light spot check list to be prepared to "1" (step S72).

Next, the reflected light spot estimator 68a selects one of eight points on the circumference obtained by equally dividing a circle whose serial number t is "1" in the circle list 67c-1, and obtains coordinates (Xu,Yu) of the selected point (step S73).

The reflected light spot estimator 68a sets the point selected at the above step S73 as coordinates of a reflected light spot in the u-th (here, the first) field in the reflected light spot check list (step S74).

The reflected light spot estimator 68a increments the serial number u in the reflected light spot check list by one (step S75), rotates the coordinates previously set by 45 degrees on the circumference (that is, moves the coordinates by 45 degrees on the circumference), and obtains coordinates (Xu, Yu) of this new point (step S76).

The reflected light post estimator 68a then determines whether or not the serial number u updated at the above step S75 in the reflected light spot check list is larger than the number (here, eight) of the plural illuminators 65 (step S77).

When the serial number u is smaller than "8", (No route at step S77), the reflected light spot estimator 68a again executes the processes at the above steps S74 to S77.

On the other hand, when the serial number u is larger than "8" (that is, when the serial number u is "9"; Yes route at step S77), the reflected light spot estimator 68a determines that estimation of the reflected light spots in the image 45 on the basis of the circle of the serial number t (here, "1") in the circle list 67c-1 (that is, preparing the reflected light spot check list on the basis of this circle) is completed, and terminates the process. The reflected light spot judgment section 68b compares the prepared reflected light spot check list with the extracted spot check list 66a to judge presence/absence of reflection (step S78).

In other words, the reflected light spot judgment section 68b compares each of all reflected light spots 65-1 to 65-8 in the reflected light spot check list with every spot in the extracted spot list 66a. When the reflected light spot 65-1, 65-2, . . . or 65-8 in the reflected light spot check list coincides with any one of the spots in the extracted spot list 66a, the reflected light spot judgment section 68b sets the check-up information of this reflected light spot 65-1, 65-2, . . . or 65-8 to "1" (refer to steps S1 to S10 in FIG. 8 described above).

The determination processor 63 obtains the number of spots determined to be reflected light spots by the reflected light spot judgment section 68b (that is, the number of pieces of the check-up information set at "1" in the reflected light spot check list), and determines whether or not the obtained number is equal to or larger than a predetermined number (here, "7") (step S79).

When the number of reflected light spots coinciding with spots in the extracted spot list 66a is equal to or larger than the predetermined number (Yes route at step S79), the determination processor 63 determines that the verification object 5 exists (step S80), and terminates the process.

On the other hand, when the number of reflected light spots coinciding with spots in the extracted spot list 66a is smaller than the predetermined value (No route at step S79), the determination processor 63 increments the serial number t in the circle list 67c-1 by one in order to execute the process on the next circle in the circle list 67c-1 (step S81).

The determination processor 63 determines whether or not the serial number t updated at the above step S80 is larger than the sum of circles in the circle list 67c-1 (step S82).

When the updated serial number t is equal to or smaller than the sum of circles in the circle list 67c-1 (No route at step S82), the process is given back to the reflected light spot estimator 68a (that is, the procedure returns to the above step S71) in order to perform the process on a circle corresponding to the updated serial number t.

On the other hand, when the updated serial number t is larger than the sum of circles in the circle list 67c-1 (Yes route at step S82), that is, when it is not determined that the verification object 5 exists as a result of execution of the processes at the above steps S71 to S79 on each and every circle in the circle list 67c-1, the determination processor 63 determines that the verification object 5 does not exist (step S83), and terminates the process.

The reflected light verification section 68 of the reflected light detector 62 and the determination processor 63 associate with each other, whereby a process of determining presence/absence of the verification object 5 can be executed on each circle retained in the circle list 67c-1, on the basis of the relevant circle. The process can be terminated when the determination processor 63 determines that the verification object 5 exists, which enables efficient and quick determination on presence/absence of the verification object 5.

The automatic door system 50 (particularly, the reflected light detecting apparatus 60) according to the second embodiment can provide effects similar to those provided by the first embodiment.

In the reflected light detecting apparatus 60, the reflected light detector 62 detects reflected light spots from the image 45 on the basis of a predetermined shape determined by arrangement positions of the plural illuminators 65 relative to the imaging device 64. Therefore, it is possible to detect reflected light spot, with certainty, and allow more accurate determination on the presence/absence of the verification object 5 by the determination processor 63.

Since the reflected light detector 62 detects reflected light spots on the basis of the predetermined shape, the reflected light detector 62 can detect the reflected light spots with certainty even when the distance between the imaging device 64 and the verification object 5 is not constant, that is, irrespective of the size or the angle of the verification object 5 in the image 45 photographed by the imaging device 64, and the determination processor 63 can determine presence/absence of the verification object 5 with certainty.

The shape judgment section 67c of the shape calculator 67 of the reflected light detector 62 adds a circle coinciding with a circle determined by the plural illuminators 65 (satisfying predetermined conditions) among circles calculated by the calculator 67b to the circle list 67c-1, and the reflected light verification section 68 detects reflected light spots on the basis of the circle list 67c-1. Therefore, the reflected light detector 62 can detect reflected light spots, highly efficiently and accurately.

[3] Others

Note that the present invention is not limited to the above examples, but may be modified or combined in various ways without departing from the spirit and scope of the invention.

In the above first embodiment, the photographing section 21 of the reflected light detector 20 has the eight illuminators 24a to 24h, for example. However, the number of illuminators provided to the photographing section 21 is not limited.

The first embodiment has been described by way of example where the reflected light spot verification section 26 of the reflected light detector 22 of the reflected light detecting apparatus 20 detects reflected light spots in the image 43 on the basis of positions (that is, the reflected light spot check list) of reflected light spots in the image 43 set beforehand on the basis of the arrangement position of the plural illuminators 24 relative to the imaging device 23. However, the present invention is not limited to this example. As a modification of the first embodiment, the reflected light detecting apparatus 20 may detect reflected light spots from the image 43 on the basis of a predetermined shape (here, a rectangular) determined by the plural illuminators 24, like the reflected light detecting apparatus 60 according to the second embodiment described above.

Namely, the reflected light detector 22 of the reflected light detector 20 may have the shape calculator 67 and the reflected light verification section 68 of the reflected light detector 62 of the reflected light detecting apparatus 60 in the second embodiment described above. Whereby, it becomes possible to detect reflected light spots from the image 43 more certainly, and determine a reflection characteristic of the verification object 2 more accurately as a result.

As a modification of the first embodiment, the reflected light detection section 22 may be without the reflected light verification section 68, instead, the reflection determination section 27 may determine a reflection characteristic of the verification object 2.

In other words, when the shape judgment section 67c of the shape calculator 67 determines that a predetermined shape calculated by the calculator 67b satisfies predetermined conditions (that is, coincides with a predetermined shape determined by the plural illuminators 24), the reflection determination section 27 may determine that reflected light spots are detected, and hence determine that the verification object 2 is a reflecting object.

On this occasion, if the shape judgment section 67c determines that all circles calculated by the calculator 67b do not satisfy the predetermined conditions, the reflection determination section 27 determines that reflected light spots are not detected, and hence determines that the verification object 2 is a non-reflecting object.

As above, since the reflection determination section 27 determines that the verification object 2 is a reflecting object when the shape judgment section 67c decides that an extracted light shape calculated by the calculator 67b satisfies the predetermined conditions, it is possible to judge the reflection characteristic, very efficiently and quickly.

Similar to the above, in the second embodiment, the reflected light detector 62 may be without the reflected light verification section 68, instead, the determination processor 63 may determine presence/absence of the verification object 5.

Namely, when the shape judgment section 67c of the shape calculator 67 judges that a predetermined shape calculated by the calculator 67b satisfies predetermined conditions (that is, coincides with the predetermined shape determined by the plural illuminators 24), the determination processor 63 may determine that reflected light spots are detected from the image 45 by the reflected light detector 62, and hence determine that the verification object 5 exists.

On the other hand, when the shape judgment section 67c determines that all circles calculated by the calculator 67b do not satisfy the predetermined conditions, the determination processor 63 may determine that reflected light spots are not detected from the image 43, and hence determine that the verification object 5 does not exist.

As above, since the determination processor 67c determines that the verification object 5 exists when the shape judgment section 67c determines that an extracted light shape calculated by the calculator 67b satisfies the predetermined conditions, it is possible to determine (detect) presence/absence of the verification object 5, very efficiently and quickly.

In the modification of the first embodiment and the second embodiment described above, the shape calculator 67 lists predetermined shapes (extracted light shapes) satisfying the predetermined conditions calculated on the basis of plural spots, the reflected light verification section 68 estimates positions of reflected light spots on the basis of the listed predetermined shapes and determines whether or not the predicted reflected light spots are true reflected light spots, and the determination processor 63 determines that the verification object 5 exists when the number of the true reflected light spots is equal to or larger than a predetermined number. However, the present invention is not limited to this example. For example, without the reflected light verification section 63, instead, when the shape judgment section 67c of the shape calculator 67 determines that an extracted light shape calculated by the calculator 67b satisfies predetermined conditions (that is, coincides with a predetermined shape determined by the plural illuminators 24 or 65), the shape judgment section 67c may judge that plural spots forming this extracted light shape are reflected light spots.

In other words, the shape judgment section 67 may function as a second judgment section which determines whether or not plural spots forming the extracted light shape are reflected light spots on the basis of the extracted light shape calculated by the calculator 67b and the predetermined shape determined by the plural illuminators 24 or 65.

More concretely, when an extracted light shape calculated by the calculator 67b and the predetermined shape agree in position and size within a predetermined error range, the shape judgment section 67c acting as the second judgment section determines that plural spots forming this extracted light shape are reflected light spots. When either the positions or the sizes do not coincide, the shape judgment section 67c determines that at least one of the plural spots forming this extracted light shape is not a reflected light spot.

On this occasion, the shape judgment section 67c acting as the second judgment section executes the above-mentioned determination process on all circles calculated by the calculator 67b to obtain the sum of spots determined to be reflected light spots, and the reflection determination section 27 or the determination processor 63 determines whether or not the sum is equal to or larger than a predetermined value, thereby to determine whether or not the verification object 2 is a reflecting object or whether or not the verification object 5 exists.

When an extracted light shape calculated by the calculator 67b satisfies predetermined conditions, the shape judgment section 67c judges that spots forming the extracted light shape are reflected light spots, obtains the sum of reflected light spots as a result of execution of the determination process on all circles calculated by the calculator 67b, and the reflection determination section 27 or the determination processor 63 makes determination on the basis of the sum, as stated above. Therefore, it is possible to execute the determination process where the accuracy of determination and efficiency are compatible.

In the above second embodiment and the above modifications, the predetermined shapes determined by the plural illuminators 24 and 65 are not limited to a circle or a rectangle. Alternatively, the predetermined shape may be a straight line formed by two illuminators, an ellipse formed by a plurality of illuminators, and so forth.

In the above first embodiment, the imaging device 23 of the photographing section 21 calculates a timing that the verification object 2 arrives on the conveyor 3, in association with an apparatus or the like in the upstream, and photographs the verification object at the calculated timing. However, the present invention is not limited to this example. For example, an infrared-ray sensor may be disposed in the upstream of the imaging device 23 to detect the verification object 2 conveyed on the belt 3b, whereby the imaging device 23 photographs the verification object 2.

In the above first embodiment, when a defective product is successively detected a predetermined number of times, the warning section 31 gives warning to the outside, using sound, image or the like. However, the present invention is not limited to this example. For example, when a defective product is successively detected a predetermined number of times, the stream of the conveying apparatus 3 may be changed (stopped, for example).

The invention claimed is:

1. A reflected light detecting apparatus comprising:
a photographing section for photographing a photographing object;
a light-projector for projecting a light spot parallel to or approximately parallel to an optical axis of said photographing section onto the photographing object; and
a detector for detecting, from an image of the photographing object photographed by said photographing section, a light spot (hereinafter referred to as a reflected light spot) from said light-projector reflected by the photographing object on the basis of an arrangement position of said light-projector relative to said photographing section, wherein said detector comprises:
an extractor for extracting a position of a light spot in the image; and
a first judgment section for judging whether the light spot in the image is the reflected light spot on the basis of the position of the light spot extracted by said extractor and the arrangement position of said light-projector.

2. The reflected light detecting apparatus according to claim 1, wherein said first judgment section of said detector compares the position of the light spot extracted by said extractor with a position of the reflected light spot in the image set beforehand on the basis of the arrangement position of said light-projector, and judges that the light spot is the reflected light spot when the position of the light spot coincides with the position of the reflected light spot, while judging that the light spot is not the reflected light spot when the position of the light spot does not coincide with the position of the reflected light spot.

3. The reflected light detecting apparatus according to claim 1 further comprising:

a reflection determination section for determining that the photographing object is a reflecting object when the reflected light spot is detected by said detector, while determining that the photographing object is a non-reflecting object when the reflected light spot is not detected by said detector.

4. The reflected light detecting apparatus according to claim 1, wherein said light-projector is provided plural in number; and
said detector performs the detection on the basis of arrangement positions of said plural light-projectors; and
said reflected light detecting apparatus further comprises:
a reflection determination section for determining that the photographing object is a reflecting object when the number of the reflected light spot detected by said detector is equal to or larger than a predetermined number, while determining that the photographing object is a non-reflecting object when the number of the reflected light spots detected by said detector is smaller than the predetermined number.

5. The reflected light detecting apparatus comprising:
a photographing section for photographing a photographing object;
a light-projector for projecting a light spot parallel to or approximately parallel to an optical axis of said photographing section onto the photographing object; and
a detector for detecting, from an image of the photographing object photographed by said photographing section, a light spot (hereinafter referred to as a reflected light spot) from said light-projector reflected by the photographing object on the basis of an arrangement position of said light-projector relative to said photographing section,
wherein said light-projector is provided plural in number, and said detector comprises:
an extractor for extracting positions of light spots in the image;
a shape calculator for calculating a shape (hereinafter referred to as an extracted light shape) corresponding to a predetermined shape determined by arrangement positions of said plural light-projectors, the extracted light shape being determined by part of or all of the positions of the plural light spots extracted by said extractor; and
a second judgment section for judging whether the plural light spots forming the extracted light shape are the reflected light spots on the basis of the extracted light shape calculated by said shape calculator and the predetermined shape.

6. The reflected light detecting apparatus according to claim 5 further comprising:
a reflection determination section for determining that the photographing object is a reflecting object when the number of the reflected light spots detected by said detector is equal to or larger than a predetermined number, while determining that the photographing object is a non-reflecting object when the number of the reflected light spots detected by said detector is smaller than the predetermined number.

7. The reflected light detecting apparatus according to claim 5, wherein said plural light-projectors are arranged so that the predetermined shape is a circle.

8. The reflected light detecting apparatus according to claim 5, wherein said plural light-projectors are arranged so that the predetermined shape is a rectangle.

9. A reflected light detecting apparatus comprising:
a photographing section being able to photograph a photographing object;
a plurality of light-projectors for projecting light spots parallel to or approximately parallel to an optical axis of said photographing section onto the photographing object; and
a detector for detecting, from an image photographed by said photographing section, light spots (hereinafter referred to as reflected light spots) on the basis of a predetermined shape determined by arrangement positions of said plural light-projectors relative to said photographing section, wherein said detector comprises:
an extractor for extracting positions of light spots in the image;
a shape calculator for calculating a shape (hereinafter referred to as an extracted light shape) corresponding to the predetermined shape, the extracted light shape being determined by part of or all of the positions of the plural light spots extracted by said extractor; and
a second judgment section for judging whether or not the plural light spots forming the extracted light shape are the reflected light spots on the basis of the extracted light shape calculated by said shape calculator and the predetermined shape.

10. The reflected light detecting apparatus according to claim 9 further comprising:
a determination section for determining that the photographing object exists when the reflected light spots are detected by said detector, while determining that the photographing object does not exist when the reflected light spots are not detected by said detector.

11. The reflected light detecting apparatus according to claim 10, wherein said determination section determines that the photographing object exists when the number of the reflected light spots detected by said detector is equal to or larger than a predetermined number, while determining that the photographing object does not exist when the number of the reflected light spots detected by said detector is smaller than the predetermined number.

12. The reflected light detecting apparatus according to claim 9, wherein said second judgment section of said detector judges that the plural light spots forming the extracted light shape are the reflected light spots when said extracted light shape and said predetermined shape are the same in position and size; while judging that at least one of the plural light spots forming the extracted light shape is not the reflected light spot when either the positions or the sizes do not coincide.

13. The reflected light detecting apparatus comprising:
a photographing section being able to photograph a photographing object;
a plurality of light-projectors for projecting light spots parallel to or approximately parallel to an optical axis of said photographing section onto the photographing object; and
a detector for detecting, from an image photographed by said photographing section, light spots (hereinafter referred to as reflected light spots) on the basis of a predetermined shape determined by arrangement positions of said plural light-projectors relative to said photographing section, wherein said detector comprises:
an extractor for extracting positions of light spots in the image;
a shape calculator for calculating a shape (hereinafter referred to as an extracted light shape) corresponding to the predetermined shape, the extracted light shape being determined by part of or all of the positions of the plural light spots extracted by said extractor;

a third judgment section for judging whether the extracted light shape and the predetermined shape are the same in position and size;

an estimator for estimating positions of the reflected light spots from said plural light-projectors on the basis of the extracted light shape and the arrangement positions of the plural light-projectors relative to said photographing section when said third judgment section judges that the extracted light shape and the predetermined shape are the same in position and size; and a fourth judgment section for comparing each of positions of the plural reflected light spots estimated by said estimator with each of positions of the plural light spots extracted by said extractor, and determining that a light spot extracted by said extractor coinciding with any one of the light spots estimated by said estimator in position is the reflected light spot.

14. The reflected light detecting apparatus according to claim 9, wherein said plural light-projectors are arranged so that the predetermined shape is a circle.

* * * * *

UNITED STATES PATENT AND TRADEMARK OFFICE
CERTIFICATE OF CORRECTION

| | |
|---|---|
| PATENT NO. | : 7,692,137 B2 |
| APPLICATION NO. | : 12/196512 |
| DATED | : April 6, 2010 |
| INVENTOR(S) | : Takahiro Aoki et al. |

It is certified that error appears in the above-identified patent and that said Letters Patent is hereby corrected as shown below:

On the title page item (75), (Inventors), Line 3, change "Kawawsaki" to --Kawasaki--.

Signed and Sealed this

Twenty-second Day of June, 2010

David J. Kappos
*Director of the United States Patent and Trademark Office*